United States Patent
Schorre et al.

[11] 3,755,336
[45] Aug. 28, 1973

[54] SULFUR-CONTAINING DERIVATIVES OF 2-METHYL-4-HYDROXYMETHYL-5-METHYLENE-PYRIDINE

[75] Inventors: Gustav Schorre, Darmstadt, Germany; Herbert Nowak, Altdorf/Uri, Switzerland

[73] Assignee: Merck Patent Gesellschaft mit beschrankter Haftung, Darmstadt, Germany

[22] Filed: July 19, 1971

[21] Appl. No.: 164,123

Related U.S. Application Data

[63] Continuation-in-part of Ser. No. 735,182, June 7, 1968, Pat. No. 3,625,949.

[30] Foreign Application Priority Data
June 8, 1967  Germany............................ M 74311
Apr. 18, 1968  Germany.................. P 17 70 222.6

[52] U.S. Cl.... 260/294.8 G, 260/243 B, 260/247.1, 260/268 S, 260/293.69, 260/294.8 D, 260/294.8 F, 260/294.8 C, 260/294.8 J, 424/246, 424/248, 424/250, 424/266, 424/267
[51] Int. Cl. ...................... C07d 31/50, C07d 31/48
[58] Field of Search............... 260/294.8 R, 294.8 G

[56] References Cited
OTHER PUBLICATIONS
Roberts et al., Basic Principles of Organic Chemistry, Benjamin Publishers, Page 806, (1965) QD 251 R 58 C.6

Karrer, Organic Chemistry, 4th English Edition, Page 928, Elsevier Pub. Co. (NY) 1950.

Primary Examiner—Alan L. Rotman
Attorney—I. William Millen et al.

[57] ABSTRACT

For descreasing the blood cholesterol level, ameliorating dysfunctions of the central nervous system and increasing the tolerance of animals to a deficiency of oxygen, compounds of the formula:

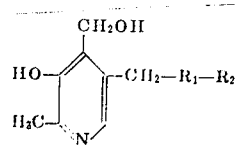

wherein $R_1$ represents

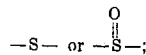

and $R_2$ represents lower acyl, lower unsaturated alkyl, unsubstituted alkyl and substituted alkyl; with the provision that when $R_1$ represents —S—, $R_2$ is other than ethyl,β-chloroethyl or β-hydroxyethyl.

12 Claims, No Drawings

SULFUR-CONTAINING DERIVATIVES OF 2-METHYL-4-HYDROXYMETHYL-5-METHYLENE-PYRIDINE

CROSS REFERENCE TO RELATED APPLICATION

This application is a continuation-in-part of copending application Ser. No. 735,182, filed June 7, 1968, now U.S. Pat. No. 3,625,949, issued Dec. 7, 1971, and contains claimed subject matter which was cancelled in the aforesaid application in response to a restriction requirement; thus, this application obtains the benefits of the provisions of 35 USC 120 and 35 USC 121.

This invention relates to a group of novel sulfur-containing pyridine derivatives and in particular to compounds suitable for improving animal tolerance to states of oxygen deficiency and the like.

Particular aspects of this invention, therefore, are to provide novel chemical compounds as well as processes and intermediates for their manufacture.

Additional aspects comprise pharmaceutical compositions based on the compounds of this invention, and also methods of administering same to animals.

Upon further study of the specification and appended claims, other aspects and advantages of this invention will become apparent.

Regarding the novel chemical compounds of this invention, they include compounds of Formula I and pharmaceutically acceptable acid addition salts thereof. Formula I is as follows:

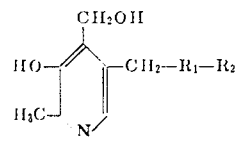

wherein
$R_1$ represents

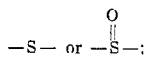

and
$R_2$ represents lower acyl, lower unsaturated alkyl, or alkyl optionally substituted by halogen, OH, lower alkoxy, SH, lower alkylthio, optionally functionally modified carboxy and/or

with the provision that, if $R_1 = -S-$, $R_2$ represents a residue other than ethyl, β-chloroethyl or β-hydroxyethyl; and wherein
$R_3$ and $R_4$, being identical or different, represent H or lower alkyl residues, which can also be combined to form a 5- or 6-membered alkylene chain optionally containing one or more hetero atoms of N, O or S.

The compounds of Formula I and slats thereof are pharmacologically efficacious.

In particular they lower the cholesterol blood level and therefore are to be considered as effective against atherosclerosis. The efficiancy is to be seen from corresponding animal experiments.

By administering these compounds in the below indicated daily dosages to young cocks, which obtain a feed with a high percentage of lipids, in the fourth week after beginning the following change for the cholesterol level in blood was found. Comparison experiments were carried out by administering ethyl-β-(4-chlorophenoxy)-isobutyrate, a substance well known as a hypolipidemic agent, e.g., from Am. Heart J., May 1968, page 707. The change of plasma cholesterol is indicated in the following in comparison to control animals which got the same feed, however no pharmacologically active compound.

| Compound | daily dosage (mg/kg body weight) | Change of plasma cholesterol in the fourth week |
|---|---|---|
| Compounds of above formula I, wherein $R_1 = S$ and $R_2=$ | | |
| $-CH_3$ | 100 | -32 % |
| $-C_3H_7$ | 100 | -32 % |
| $-C_4H_9$ | 100 | -48 % |
| $-C_2H_4NH_2$ | 100 | -49 % |
| $C_5H_{11}$ | 50 | -57 % |
| $-C_7H_{15}$ | 50 | -35 % |
| $-C_{10}H_{21}$ | 50 | -26 % |
| $-C_{20}H_{41}$ | 50 | -30 % |
| $-C_5H_{10}-CH_2OH$ | 50 | -20 % |
| ethyl-α-(4-chlorophenoxy)-isobutyrate (comparison substance) | 300 | +43 % |

The comparison substance ethyl-α-(4-chlorophenoxy) isobutyrate was administered in a relatively high dosage of 300 mg/kg, because no more favourable influence on the blood cholesterol level was obtained in lower dosages.

From the above results it is to be seen that the compounds I show an outstanding hypolipidemic efficiency.

Additionally compounds of Formula I and salts thereof are highly effective in ameliorating dysfunctions of the central nervous system, based on activating effects primarily on the lymbic system. These novel compound differ from known neurotropic agents by a special activity profile. The compounds show a distinct efficiency on the electric cerebral activity combined with a remarkably favourable influence on the lipid metabolism.

Besides, the compounds of Formula I and salts thereof improve the tolerance of animals to oxygen deficiency. For example, in experiments on rats, the test animals were subjected to a subatmospheric pressure corresponding to an altitude of about 12,000 meters, and then the electroencephalogram of the test animals was continuously recorded by way of three lead wires attached to the scalp. After the intraperitoneal administration of 100 mg of a compound of Formula I or salt thereof, for example, 2-methyl-3-hydroxy-4-hydroxymethyl-5-methylthiomethylpyridine, the electroencephalogram is compared. This procedure was repeated on seven successive days, and it was discovered that animals treated in this manner exhibited a marked improvement in their tolerance to diminished oxygen concentrations. It is particularly noteworthy that the increased tolerance shows up immediately after injection, whereas in a comparative experiment with identical dosages of the conventional compound bis-[2-methyl-3-hydroxy-4-hydroxymethyl-pyridyl-(5)-methyl]-disulfide employed for the same purpose, no such immediate effect can be attained. Several compounds embraced by the above Formula I exhibit a physiologically protective effect against high intensity radiation.

For example, compounds of Formula I, which contain the radical

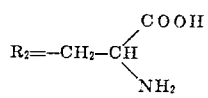

and salts thereof show such a protective effect.

Additionally, the compounds of Formula I and salts thereof are useful to treat the types of pathological conditions often treated with the known bis-(3-hydroxy-4-hydroxymethyl-2-methyl-pyridyl-(5)-methyl)-disulfide.

The compounds according to the present invention may be administered for the following indications:

Atherosclerosis, organic psychic syndromes in regressive processes; nervous exhaustion and insufficiency during the involution period, neurasthenic syndromes of constitutional origin. "executive" disease; posttraumatic craniocerebral disorders, apoplexy, encephalitis and intoxications (especially in chronic alcoholism). Parkinsonism. Mental and psychic retardation of development during childhood. For interval therapy of migraine and long-term therapy of idiopathic trigeminal neuralgia.

As further compared to the above-mentioned known drug, bis- ]2-methyl-3-hydroxy-4-hydroxymethyl-pyridyl-(5)-methyl]-disulfide, the compounds of this invention are distinguished by the fact that the solubility thereof in water and/or lipoids can be varied by tailoring the residue $R_2$ both with respect to the length of chain and the choice of more or less polar substituents. For example, compared to the known disulfide, the compound 2-methyl-3-hydroxy-4-hydroxymethyl-5-methylthiomethyl-pyridine of this invention is ten times more soluble in water, and the compound 2-methyl-3-hydroxy-4-hydroxymethyl-5-methylsulfinylmethyl-pyridine is 100 times more soluble in water.

Compounds of the above-mentioned Formula I substituted in the residue $R_2$ by amino and/or carboxy groups exhibit the additional advantage that they are water-soluble in the physiological pH-range, i.e., pH 5 to 8, thus being particularly suitable for the preparation of injection solutions. In contradistinction thereto, the above-mentioned known disulfide is insoluble in water within the physiological pH-range.

Compounds of the aforementioned Formula I containing longer alkyl residues in the $R_2$ residue are distinguished, as compared to the conventional disulfide, by increased lipoid solubility. These compounds can penetrate cell membranes relatively rapidly and are more satisfactorily absorbed by the lipoid-rich nerve tissue.

To prepare the above-mentioned compounds of Formula I and the salts thereof, several alternative processes can be employed as follows:

a. liberating a free hydroxy group and optionally free amino groups from a starting compound of Formula II or the salts thereof

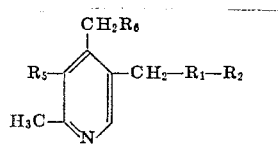

wherein $R_5$ and $R_6$, being identical or different, represent a free or functionally modified OH group with the provision that at least one of $R_5$ and $R_6$ represents a functionally modified OH group; and $R_1$ and $R_2$ have the above-indicated meanings, and wherein, undesired functionally modified OH and/or amino groups are optionally contained in the residue $R_2$;

b. a 5-thiomethyl-pyridine derivative of the following Formula III or a salt thereof is reacted with an alkylating or acylating agent:

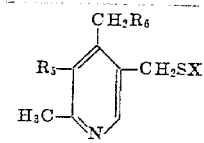

wherein $R_5$ and $R_6$, being identical or different, represent OH groups which are optionally functionally modified; and X represents H or an alkali or alkaline earth metal cation, preferably $Na^+$, or an optionally substituted alkyl, aryl or aralkyl residue, or an undesired acyl residue, or the residue

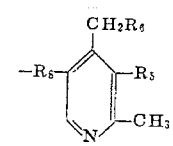

wherein $R_8$ is $-CH_2-$ or $-S-CH_2-$;

c. a pyridine derivative of the Formula IV or a salt thereof

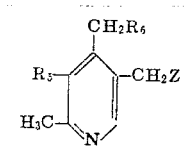

wherein

Z represents a sulfonic acid residue, particularly p-toluenesulfonyloxy; halogen, preferably Cl or Br; or the residue

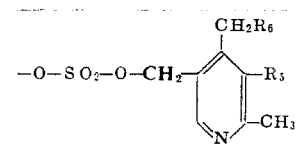

and $R_5$ and $R_6$ have the meanings set forth for Formula III, is reacted with a mercapto compound of Formula V $$YS - R_2$$

V wherein

Y represents H or an alkali or alkaline earth metal cation, preferably $Na^+$; and $R_2$ has the above indicated meanings;

d. a pyridine derivative of Formula VI, as set out below, or a salt thereof is treated with a reducing agent or, if desired, with a nucleophilic reagent, particularly a base:

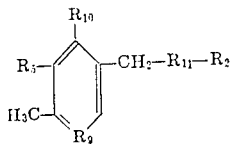

VI wherein
$R_9$ is

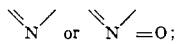

$R_{10}$ represents —$CH_2R_6$ or a free or functionally modified formyl group; and

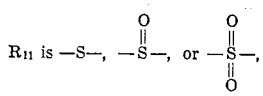

with the provision that
$R_9$ is always

when $R_{10}$ is —$CH_2R_6$ and $R_{11}$ is —S—; and that $R_{10}$ is always a free or functionally modified formyl group when $R_9$ represents

and $R_{11}$ represents —S—; and that $R_{11}$ is always

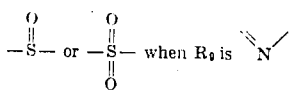

and $R_{10}$ is —$CH_2R_6$; and wherein
$R_2$, $R_5$ and $R_6$ have the meanings indicated in Formula I or III, respectively, and wherein, additionally, undesired substituents may also be present in the residue $R_2$, which undesired substituents can be split off by reduction, or can be converted into the desired substituents for $R_2$ as set forth in the above definition;

e. a pyridoxamine derivative of Formula VII or a salt thereof,

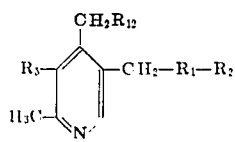

VII wherein
$R_{12}$ represents an amino group which is optionally substituted by acyl or triphenylmethyl; and
$R_1$, $R_2$ and $R_5$ have the meanings indicated in Formula I or III, respectively,
is treated with nitrous acid to convert the amino residue $R_{12}$ into a hydroxy group;

f. a 5-thiomethyl-pyridine derivative of the above Formula III, wherein X represents H or an alkali or alkaline earth metal cation, is combined by the addition mechanism with alkene or alkyne optionally substituted by halogen, OH, lower alkoxy, SH, lower alkylthio, carboxy, functionally modified carboxy and/or

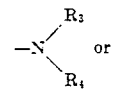

g. in a compound of the above Formula I or in the salts thereof, containing, however, in the residue $R_2$ undesired substituents, particularly halogen, CO, $NO_2$, NO and/or COOH and/or C—C unsaturated bonds; or not as yet containing desired substituents, especially $NH_2$, $N(CH_3)_2$, COOH, SH and/or OH and/or desired C—C unsaturated bonds, the undesired substituents are split off, or the unsaturated C—C multiple bonds are hydrogenated; or the desired substituents and/or C—C unsaturated bonds are introduced.

In addition, it is also possible to split off any remaining protective groups in the residues $R_5$ and $R_6$ after conducting the processes (b) to (g), under the conditions of process (a).

Furthermore, if desirable, the thus-obtained compounds of the above-mentioned Formula I wherein $R_1 = $ —S—, can be oxidized to the corresponding compounds having the substituent

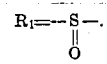

Still further, the free bases of Formula I can be converted into the acid addition, quaternary ammonium or the tertiary sulfonium salts thereof. Conversely, the free bases can be liberated from the acid addition, quaternary ammonium or tertiary sulfonium salts thereof.

In the compounds of Formula I of this invention, the residue $R_1$ represents

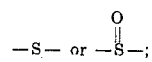

the compounds having the residue $R_1 = $ —S— being preferred.

The residue $R_2$ in the compounds of Formula I can represent the following:

Lower acyl, preferably acyl of a carboxylic acid of up to 8 carbon atoms, for example, acetyl, propionyl, butyryl, the acetyl residue being preferred;

The residue $R_2$ can also represent lower unsaturated alkyl, preferably alkenyls, such as vinyl, allyl, propenyl, or butenyl; or alkynyl residues, such as ethynyl or propargyl. Preferred residues are vinyl and propargyl.

Of special importance, however, are compounds of the above Formula I wherein $R_2$ represents an alkyl residue, optionally substituted as indicated in Formula I. The alkyl residue can be straight-chain or branched, and generally has no more than 20 carbon atoms. Suitable alkyl residues are long chain alkyls, such as hexyl, heptyl, octyl, nonyl, decyl, dodecyl, eikosyl and lower alkyls such as methyl, n-propyl, isopropyl, n-butyl, isobutyl and pentyl. Particularly preferred are compounds wherein $R_2$ represents n-pentyl, n-butyl or methyl.

An alkyl residue $R_2$ can be monosubstituted, or polysubstituted at any and all carbon positions, but preferably the alkyl is substituted by not more than 3 substituents. The preferred position for the substitution of the alkyl is the ω-position.

For halogen substitution, Cl and Br are preferred. Additional substituents for the alkyl residue $R_2$ are OH; lower alkoxy, such as methoxy and/or ethoxy, mercapto groups; and/or lower alkylthio groups, particularly methylthio. In particular preferred residues $R_2$ are —$CH_2OH$ and —$C_5H_{10}CH_2OH$.

Alkyl can also be substituted by amino groups —$NR_3R_4$, wherein $R_3$ and/or $R_4$ represent H or lower alkyl, and wherein alkyl residues $R_3$ and $R_4$ can also be joined together to form an alkylene residue, optionally by way of a nitrogen, oxygen or sulfur atom. Thus, together with the N atom of the amino group, the alkyl residues can form, for example, a piperidino, morpholino, piperazino or thiomorpholino residue. Preferably, the substituents $R_3$ and $R_4$ are identical and represent H or $CH_3$ or $C_2H_5$. Examples of amino-substituted alkyl residues $R_2$ include, but are not limited to: 2-aminoethyl, 3-aminopropyl, 3-amino-2-methylpropyl, 4-aminobutyl, as well as the corresponding N-methyl, N-ethyl, N-propyl, N-butyl, N,N-dimethyl, N,N-diethyl, N-methyl-N-ethyl, and piperidino derivatives. In this connection, particularly preferred is 2-aminoethyl and dimethylaminoethyl.

The alkyl residue $R_2$ can be further substituted by a free carboxy group or a functionally modified carboxy group, in particular by an esterified or amidated carboxy group of a total of up to 8 carbon atoms. A suitable esterified carboxy residue is, for example: lower carbalkoxy, such as carbomethoxy, carbethoxy, or also carbobenzoxy. A particularly suitable amidated carboxy residue is -$CONH_2$. However, the hydrogen atoms of the amino group can also be substituted by lower alkyl residues which can be joined with one another, if desired by an additional hetero atom in the same manner as N $R_3R_4$. In addition to the residue —$COHN_2$, also suitable are the N-methyl, N-ethyl, N-propyl, N-butyl, N,N-dimethyl, N,N-diethyl, N,N-dipropyl, N-methyl-N-ethyl amides, as well as the piperidides, piperazides and morpholides or thiomorpholides. Preferred substituents are COOH, $COOC_2H_5$, $CONH_2$, $CON(CH_3)_2$ and $CON(C_2H_5)_2$.

Optionally, it is also possible for the alkyl residue $R_2$ to contain different substituents, for example, $NH_2$ and COOH groups, at the same time. Thus, $R_2$ can represent, for example, an ω-amino-ω-carboxyalkyl residue, e.g.,

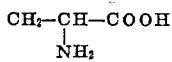

wherein the carboxy group can optionally also be esterified or amidated, or otherwise functionally modified.

Preferred compounds of the above Formula I are those wherein $R_2$ represents the following: $COCH_3$, allyl, propargyl, alkyl containing no more than 20 C - atoms as $CH_3$, $C_3H_7$, $C_4H_9$, —$C_5H_{11}$, $C_7H_{15}$, $C_{10}H_{21}$, $C_{20}H_{41}$, especially $C_5H_{11}$, $C_4H_9$ and $CH_3$, lower alkyl substituted by $NR_3R_4$, OH, $COOCH_3$, especially —$C_2H_4NH_2$, —$C_2H_4N(CH_3)_2$, —$CH_2OH$, —$C_5H_{10}CH_2OH$,

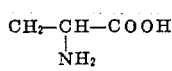

Among the preferred products of Formula I wherein $R_1 =$ —S—, the following examples are set forth:

2-methyl-3-hydroxy-4-hydroxymethyl-5-(methylthiomethyl)-pyridine,
2-methyl-3-hydroxy-4-hydroxymethyl-5-(allylthiomethyl)-pyridine,
2-methyl-3-hydroxy-4-hydroxy-methyl-5-(propargylthiomethyl)-pyridine,
2-methyl-3-hydroxy-4-hydroxymethyl-5-(isopropylthiomethyl)-pyridine
2-methyl-3-hydroxy-4-hydroxymethyl-5-(n-butylthiomethyl)-pyridine,
2-methyl-3-hydroxy-4-hydroxymethyl-5-(hydroxymethylthiomethyl)-pyridine,
2-methyl-3-hydroxy-4-hydroxymethyl-5-(β-mercaptoethylthiomethyl)-pyridine,
2-methyl-3-hydroxy-4-hydroxymethyl-5-(methylthioethylthiomethyl)-pyridine,
2-methyl-3-hydroxy-4-hydroxymethyl-5-carbethoxymethylthiomethyl)-pyridine,
2-methyl-3-hydroxy-4-hydroxymethyl-5-(β-aminoethylthiomethyl)-pyridine,
2-methyl-3-hydroxy-4-hydroxymethyl-5-(β-dimethylaminoethylthiomethyl)-pyridine,
2-methyl-3-hydroxy-4-hydroxymethyl-5-(β-amino-β-carboxyethylthiomethyl)-pyridine.
2-methyl-3-hydroxy-4-hydroxymethyl-5-acetyl-thiomethyl-pyridine,
2-methyl-3-hydroxy-4-hydroxymethyl-5-pivalyl-thiomethyl-pyridine,
2-methyl-3-hydroxy-4-hydroxymethyl-5-carbomethoxyethyl-thiomethyl-pyridine,
2-methyl-3-hydroxy-4-hydroxymethyl-5-β-acetoxyethyl-thiomethyl-pyridine,
5-hydroxy-4-hydroxymethyl-3-[(2-cyanoethyl)-thiomethyl]-6-methyl-pyridine,
5-hydroxy-4-hydroxymethyl-3-[(2-ethoxy)ethyl-thiomethyl]-6-methyl-pyridine,
5-hydroxy-4-hydroxymethyl-3-[(2-hydroxy-n-propyl)-thiomethyl]-6-methyl-pyridine,
5-hydroxy-4-hydroxymethyl-3-[(6-hydroxy-n-hexyl)-thiomethyl]-6-methyl-pyridine,
5-hydroxy-4-hydroxymethyl-3-[1,2-diethoxycarbonyl)ethyl-thiomethyl]-6-methyl-pyridine,
5-hydroxy-4-hydroxymethyl-3-[(1-methyl-2-ethoxycarbonyl)ethyl-thiomethyl]-6-methyl-pyridine,
5-hydroxy-4-hydroxymethyl-3-[(2,3-dihydroxy)-propyl-thiomethyl]-6-methyl-pyridine,
5-hydroxy-4-hydroxymethyl-3- n - dodecyl-thiomethyl-6-methyl-pyridine,
5-hydroxy-4-hydroxymethyl-3- n - pentyl-thiomethyl-6-methyl-pyridine,
5-hydroxy-4-hydroxymethyl-3- n - hexyl-thiomethyl-6-methyl-pyridine,
5-hydroxy-4-hydroxymethyl-3- n - heptyl-thiomethyl-6-methyl-pyridine,
5-hydroxy-4-hydroxymethyl-3- n - octyl-thiomethyl-6-methyl-pyridine,
5-hydroxy-4-hydroxymethyl-3- n - nonyl-thiomethyl-6-methyl-pyridine,
5-hydroxy-4-hydroxymethyl-3- n - decyl-thiomethyl-6-methyl-pyridine,
5-hydroxy-4-hydroxymethyl-3- n - hexadecyl-thiomethyl-6-methyl-pyridine, 5-hydroxy-4-hydroxymethyl-3- n - octadecyl-thiomethyl-6-methyl-pyridine,
5-hydroxy-4-hydroxymethyl-3- n - eikosyl-thiomethyl-6-methyl-pyridine,
5-hydroxy-4-hydroxymethyl-3- n - propyl-thiomethyl-6-methyl-pyridine,
5-hydroxy-4-hydroxymethyl-3- (3-bromopropyl-thiomethyl)-6-methyl-pyridine,
5-hydroxy-4-hydroxymethyl-3- (3-hydroxypropyl-thiomethyl)-6-methyl-pyridine,
5-hydroxy-4-hydroxymethyl-3- (3-mercaptopropyl-thiomethyl)-6-methyl-pyridine,
5-hydroxy-4-hydroxymethyl-3- [(2-carboxyethyl)thiomethyl]-6-methyl-pyridine,
5-hydroxy-4-hydroxymethyl-3- [(5-oxo-hex-3-en)thiomethyl] -6-methyl-pyridine,
5-hydroxy-4-hydroxymethyl-3- [-(2-bromopropyl)-thiomethyl] -6-methyl-pyridine,
5-hydroxy-4-hydroxymethyl-3- [(2,3-dibromo-propyl)thiomethyl] -6-methyl-pyridine,
5-hydroxy-4-hydroxymethyl-3- [(3-hydroxy-3-bromopropyl)thiomethyl] -6-methyl-pyridine, yridine,
5-hydroxy-4-hydroxymethyl-3- [(3-chloro)-but-(1)-yl)thiomethyl] -6-methyl-pyridine,
5-hydroxy-4-hydroxymethyl-3- [(1-hydroxypropyl)-thiomethyl] -6-methyl-pyridine,
5-hydroxy-4-hydroxymethyl-3- [(3-hydroxybutyl)-thiomethyl] -6-methyl-pyridine,
5-hydroxy-4-hydroxymethyl-3- [(2-ethoxyethyl)thi-omethyl] -6-methyl-pyridine,
5-hydroxy-4-hydroxymethyl-3- [(2-dibutylamino)e-thylthiomethyl] -6-methyl-pyridine,
5-hydroxy-4-hydroxymethyl-3- [(3-aminopropyl)thi-omethyl] -6-methyl-pyridine,
5-hydroxy-4-hydroxymethyl-3-carboxymethyl-thiomethyl-6-methyl-pyridine,
β- [(5-hydroxy-4-hydroxymethyl-6-methylpyridyl(3)-methyl)thio]-propionic acid,
5-hydroxy-4-hydroxymethyl-3- [(2-methoxycarbonyl)-ethyl]thiomethyl-6-methyl-pyridine,
S- [5-hydroxy-4-hydroxymethyl-6-methyl-pyridyl-(3)-methyl]cysteine-ethylester
5-hydroxy-4-hydroxymethyl-3- [(2-carboxylethyl)-thiomethyl] -6-methyl-pyridine,
5-hydroxy-4-hydroxymethyl-3- [(2,2-diethoxy-ethyl-(1)]thiomethyl-6-methyl-pyridine,
5-hydroxy-4-hydroxymethyl-3-methylaminomethylthiomethyl-6-methyl-pyridine,
5-hydroxy-4-hydroxymethyl-3-dimethylaminomethylthiomethyl-6-methyl-pyridine,
5-hydroxy-4-hydroxymethyl-3-methylaminoethylthiomethyl-6-methyl-pyridine,
5-hydroxy-4-hydroxymethyl-3-ethylaminoethylthiomethyl-6-methyl-pyridine,
5-hydroxy-4-hydroxymethyl-3-dimethylaminoethylthiomethyl-6-methyl-pyridine,
5-hydroxy-4-hydroxymethyl-3-dipropylaminoethylthiomethyl-6-methyl-pyridine
5-hydroxy-4-hydroxymethyl-3-dihexylaminoethylthiomethyl-6-methyl-pyridine.

Additionally, the following compounds are preferred wherein the residue $R_1$ represents

2-methyl-3-hydroxy-4-hydroxymethyl-5-(methylsulfinylmethyl)-pyridine,
2-methyl-3-hydroxy-4-hydroxymethyl-5-(ethylsulfinylmethyl)-pyridine,
2-methyl-3-hydroxy-4-hydroxymethyl-5-(allylsulfinylmethyl)-pyridine,
2-methyl-3-hydroxy-4-hydroxymethyl-5-(propargylsulfinylmethyl)-pyridine.

In addition to the free bases of the above Formula I, the present invention likewise encompasses the salts thereof, i.e., acid addition salts, particularly with strong mineral acids, such as sulfuric acid or a hydrohalic acid, e.g., hydrochloric acid or hydrobromic acid, and also the quaternary ammonium or tertirary sulfonium salts.

Of particular importance is 2-methyl-3-hydroxy-4-hydroxymethyl-5-methylthiomethyl-pyridine, pharmacologically highly efficacious, and the acid addition salts thereof, e.g., the hydrohalogenides thereof, particularly the hydrochloride or also the sulfate. Among the quaternary ammonium or tertiary sulfonium salts of this compound, the methoiodide is especially preferred.

Processes for the preparation of the compounds of this invention will now be described in greater detail:

a. In accordance with one process of the present invention, the compounds of Formula I are obtained by liberating hydroxy groups from a starting compound of the above set forth Formula II, containing functionally modified hydroxy groups in the 3- and/or 4'-position.

As preferred starting compounds of this embodiment, substances of the above-mentioned Formula II are selected wherein $R_5$ and/or $R_6$ represent acyloxy, particularly lower acyloxy, such as acetoxy, propoxy, butoxy, wherein acetoxy is preferred, or $R_5$ and $R_6$ together represent

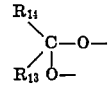

(in this connection $R_{13}$ and $R_{14}$ represent H or lower alkyl, or are together alkylidene or cycloalkylidene or aralkylidene of preferably up to 7 carbon atoms, such as methylene, ethylidene, isopropylidene, cyclohexylidene, benzylidene. In particular preferred are these compounds, wherein $R_{13}$ and $R_{14}$ represent, together with the C-atom connecting $R_{13}$ and $R_{14}$, alkylidene or cycloalkylidene or aralkylidene). Furthermore, the residues $R_5$ and $R_6$ can, if desired, also be alkoxy, particularly lower alkoxy, such as $CH_3O-$, $C_2H_5O-$ or $C_3H_7O-$.

In order to liberate the hydroxy group(s), saponifying alkaline reactants or hydrolyzing acid reactants are preferably employed, the latter being more preferred. Thus, acidic reactants are employed, for example, if an alkylidene residue is to be split off from the substituents $R_5$ and $R_6$. In case of acidic hydrolysis, it is possible to liberate OH from a residue $R_5$ or $R_6$, for example, with mineral acids, especially hydrochloric, hydrobromic or sulfuric acid. Also suitable for the acid hydrolysis are, for example, hydrobromic acid/glacial acetic acid, pyridine hydrochloride at an optionally elevated temperature, or Lewis acids, particularly $BF_3$ or $AlCl_3$ in suitable solvents, such as ether or tetrahydrofuran. The acyl groups are split off satisfactorily, for example, by the effect of hydrochloric acid at boiling temperature for about one-half hour. Starting compounds of Formula II wherein the substituents $R_5$ and $R_6$ together represent

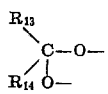

can be liberated even with very dilute acid, e.g., 0.01N $H_2SO_4$.

If starting substances of Formula II are selected wherein $R_5$ and/or $R_6$ represent acylated hydroxy groups (for example,

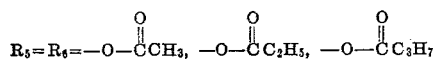

or benzoyloxy) the blocking groups can also be split off by means of alkalis, for example, by means of alkali hydroxide or carbonate, such as sodium or potassium carbonate.

If desired, functionally modified hydroxy and/or amino and/or carboxy groups can likewise be liberated in the side chain $R_2$ in this embodiment.

Preferred starting compounds for this embodiment are, for example, compounds of the above Formula II wherein:

all steps being in accordance with methods known from the literature.

b. For the introduction of the residue $R_2$ into a starting compound of Formula III in accordance with the aforementioned mode of operation (b), suitable agents are those conventionally employed for the S-alkylation and S-acylation, respectively, as they are described, for example, in Houben-Weyl, "Methoden der Organischen Chemie" (Methods of Organic Chemistry), 4th Edition, Vol. 9 (1955), Georg Thieme Publishers, Stuttgart, pp. 197 et seq.

Primarily employed for the alkylation are the corresponding reactive esters containing a residue $R_2$, particularly alkyl halogenides or alkyl sulfuric acid esters or alkyl sulfonic acid esters, particularly p-toluenesulfonates. For example, there are employed the corresponding, optionally substituted alkyl chlorides, bromides and iodides, or sulfates of the Formula $R_2$-halogen or $(R_2)_2SO_4$, wherein $R_2$ has the above-indicated meanings, such as, for instance, methyl iodide, propyl chloride, butyl bromide, β-chloroethylamine; α-amino-β-chloropropionic acid; β-chloroethylmercaptan, dimethyl sulfate, chloroformic acid esters, chloracetic acid esters, allyl bromide, propargyl chloride, methyl p-toluenesulfonate, propyl bromide or iodide, isopropyl bromide or iodide, sec.-butyl bromide, sec.-butyl iodide, diethyl sulfate, ethyl p-toluenesulfonate, (β-hydroxy)-ethyl p-toluenesulfonate, (β-chloro)-ethyl p-toluenesulfonate, chloracetic acid, bromacetic acid ester, β-piperidinoethyl chloride and bromide, n-(β-chloro[or-bromo] ethyl)-morpholine, N-(β-chloro [or -bromo] ethyl)-thiomorpholine.

Ethylenimine can also be employed as the alkylating agent for introducing the aminoethyl residue.

| | |
|---|---|
| $R_1$=—S— and | |
| $R_2$=—CH$_3$ or C$_4$H$_9$ or C$_5$H$_{11}$ | $R_5$ and $R_6$ together represent 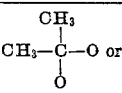 or |
| $R_2$=—COCH$_3$. | $R_5$ and $R_6$ together represent 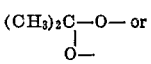 or |
| $R_2$=—CO—(CH$_2$)$_{10}$—CH$_3$. | $R_5$ and $R_6$ together represent 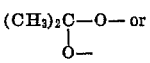 or |
| $R_2$=—CH$_2$—CH$_2$—NH$_2$. | $R_5$ and $R_6$ together represent  or |
| $R_2$=—CH$_2$COOC$_2$H$_5$. | $R_5$ and $R_6$ each represents  or |
| $R_2$=—(CH$_2$)$_2$—NHCOOC$_2$H$_5$. | $R_5$ and $R_6$ each represents  or |
| $R_2$=—CH$_2$—CH(COOH)(NH$_2$) | $R_5$ and $R_6$ together represent 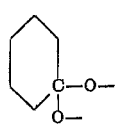 |

These starting compounds can be produced, for example, by alkylation or acylation of a compound according to Formula II, having in place of $R_2$, H or Na$^+$, respectively, with a halogen-$R_2$ or an acyl halogenide, respectively, optionally followed by oxidation of the residue

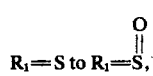

Suitable starting compounds of Formula III are, e.g.: [3-hydroxy-4-hydroxymethyl-2-methyl-pyridyl(5)]-methyl mercaptan, [3-acetoxy-4-acetoxymethyl-2-methyl-pyridyl(5)]-methyl mercaptan, and the corresponding mercaptides, particularly the sodium mercaptides. The starting products of Formula III are obtainable, for example, by reacting the corresponding 5-halogenomethyl-pyridine compounds with alkali hydrogen sulfide, thiourea or potassium thiocarbonate and, if desired, subsequently reacting the product with alkali. Details of these steps are found in the literature, e.g., Houben-Weyl, Methoden der Organischen Chemie, 4. edition, Verlag Georg Thieme, Stuttgart, Vol. 9, page 97 ff. (1955).

The starting compounds III are suitably alkylated by combining the reactants in an inert solvent, if desired, under cooling. For example, a mercaptide of Formula III is introduced into an aqueous or alcoholic solution, and the alkylating agent, for example an alkyl halogenide or the dialkyl sulfate, is added in an equivalent amount or in a slight excess. The reaction can be conducted at room temperature, by allowing the reaction mixture to stand overnight, for example. If desired, it is also possible to operate at an elevated temperature; for instance, the alkylation can be conducted by heating the mixture for several hours on a steam bath.

In case starting compounds III are present wherein the residues $R_5$ and $R_6$ represent free OH groups, it is advisable not to employ an excess of the alkylating agent in order to avoid an undesired O-alkylation in this manner. Optionally, the mixture is neutralized after the reaction is terminated. The desired final product generally precipitates from the solution during cooling.

It is furthermore possible, for example, to conventionally alkylate a mercaptan III in water or in an alcohol in the presence of an alkali or alkaline earth compound, e.g., an alkali or alkaline earth hydroxide, or an alkali metal alcoholate, such as sodium methylate or ethylate — there being at first produced a mercaptide of Formula III (X = alkali or alkaline earth metal cation). After the reaction is terminated, the solvent is suitably removed by concentrating the mixture by evaporation, if the alkylation process were conducted in alcohol. Thereafter, the salts contained in the mixture can be removed by treatment with water; the thus-formed final products can be isolated from the residue by extraction with a suitable organic solvent, e.g., ethyl acetate or a chlorinated hydrocarbon, such as chloroform, methylene chloride, trichloroethylene or ether, and evaporation of the extraction agent.

By reaction with an alkylating agent under the aforementioned conditions, it is also possible to exchange, in a starting compound of Formula III, an undesired residue X against a desired alkyl residue. By reacting a starting compound III containing an undesired above-defined residue X with, for example, a methyl halogenide, particularly methyl iodide, a compound of the above Formula I is obtained, for instance, wherein $R_2$ = $CH_3$. If desired, salts, e.g., sulfonium salts, of the starting compounds III can be employed for this alkylating splitting process.

In case starting compounds III are employed wherein X represents an optionally substituted undesired alkyl residue or also an aryl or aralkyl residue, which can likewise be substituted, the desired residue $R_2$ is introduced by reaction with an alkylating agent under the conditions mentioned above, by transalkylation. Suitable starting compounds for this special modification of process (b) are, for example, compounds of the above-mentioned Formula III which contain the substituent X = —$COCH_2C_6H_5$ or —$CH_2$—$CH═CH_2$ and which can be transalkylated, for example, with $CH_3I$ in a compound I ($R_1$ = —S—; $R_2$ = $CH_3$). It is also possible, in starting compounds III containing the residue X = $CH_3$, to replace this residue, e.g., by transalkylation with, for example, $ClCH_2COOH$, by $R_2$ = $CH_2COOH$. The following compounds are exemplary for the starting products:

2-methyl-3-hydroxy-4-hydroxymethyl-5-phenacyl-thiomethyl-pyridine; 2-methyl-3-hydroxy-4-hydroxymethyl-5-benzyl-thiomethyl-pyridine; and 2-methyl-3-hydroxy-4-hydroxymethyl-5-methylthiomethyl-pyridine.

The more specific conditions for the execution of the transalkylation or acylation are described in Houben-Weyl, loc. cit., Vol. 9 (1955), p. 190, or in "Chem. Ber." [Chemical Reports] 83, 90 (1950), 86, 1049 (1953), and "Ann. Chemie" [Annals of Chemistry] 566, 139 (1950).

The starting compounds can be produced, for example, by alkylating a compound of the above Formula III under the conditions described above in (b).

In the compounds of Formula III, the undesired residue X is removed by treatment with, e.g., an alkyl halogenide, particularly a methyl halogenide, such as methyl bromide or methyl iodide, with the simultaneous introduction of the desired residue $R_2$.

Insofar as starting compounds of the above Formula III are employed wherein X represents the residue

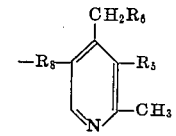

($R_5$, $R_6$ and $R_8$ having the above indicated meanings), there is obtained in this embodiment of the process of this invention the desired final product of the above-mentioned Formula I by reaction with an alkylating agent by alkylative splitting. In this alkylative splitting step, in the final analysis, the undesired residue X is likewise substituted by the desired residue $R_2$. For this modification, suitable starting products are, e.g.: bis-[2-methyl-3-hydroxy-4-hydroxymethyl-pyridyl-(5)-methyl]-di- (or -mono-) sulfide, or the corresponding tertiary S-alkyl compounds, for instance, the S-methyl compounds (above Formula III wherein $R_5$ and

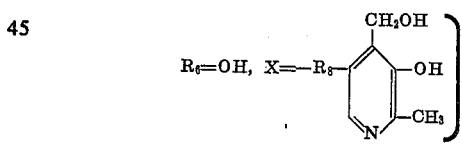

These starting compounds are obtainable, for example, by reacting a compound of Formula III (X = $Na^+$) with a compound of Formula IV (Z = Hal) or a compound of Formula IV (Z = Hal) with an alkali disulfide, e.g., $Na_2S_2$.

Compounds of Formula I wherein the residue $R_2$ = $CH_2OH$ can also be produced from the starting compounds III wherein X = H, by reaction with formaldehyde. Suitably, a mercaptan or mercaptide III in an aqueous solution, to which is optionally added an inert organic solvent, particularly alcohol, is mixed for this purpose with an aqueous, preferably 40 percent solution of formaldehyde and allowed to stand several hous, e.g., overnight. In this connection, it is advantageous to employ an excess of formaldehyde.

In order to introduce a residue $R_2$ = $CH_3$ into a starting compound II wherein X = H and $R_5$ and $R_6$ have the above-indicated meanings, a suitable alkylating agent is furthermore diazomethane, in particular. In this reaction, conditions are employed, for example, which are described in "Neuere Methoden der praparativen organischen Chemie" [More Recent Methods of Preparative Organic Chemistry], published by W. Foerst, Chemie Publishers, Weinheim (1949), 3rd Edition, Vol. I, pp. 359–412.

A substituent $R_2$ = acyl can be introduced into a starting compound of Formula III (X = H, alkali or alkaline earth metal cation or undesired acyl residue) by treatment with the conventional acylating agents.

For the acylation of the starting products III, carboxylic acids can be employed, or the reactive derivatives thereof customarily used for esterification purposes, for example, acid halogenides, particularly acid chlorides, acid anhydrides or also ketenes, in particular symmetrical acid anhydrides. The conditions for this particular embodiment are described, for instance, in Houben-Weyl, "Methoden der Organischen Chemie" [Methods of Organic Chemistry], 4th Edition, Thieme Publishers, Stuttgart, Vol. 9 (1955), pp. 753 - 756. By reacting a starting product of Formula III (X = H or Na) with, for example, an acetyl halogenide, particularly acetyl chloride or bromide, or acetic anhydride, or with a ketene, the acetyl residue can be introduced at the S atom. Besides, an acyl residue $R_2$ can be introduced into a starting compound III (X = H), by making a carboxylic acid react with the available starting product in the presence of a carbodiimide, in particular dicyclohexyl carbodiimide. Preferred are inert solvents which do not contain any active hydrogen, such as, for example, halogenated hydrocarbons, such as $CHCl_3$ or $CH_2Cl_2$, or nitrohydrocarbons, such as nitromethane, or acetonitrile or ethyl acetate.

Furthermore, compounds of the above Formula I wherein $R_2$ represents acyl can be converted, by reacting the starting products III (X = H) with a nitrile and hydrochloric acid to the corresponding iminothioether-hydrochloride or with isocyanate to the corresponding thiourethane-S-ester.

The thus-obtained intermediate products are thereafter hydrolyzed to the desired compounds of Formula I wherein $R_2$ represents acyl. The procedure followed is, for example, that described in Houben-Weyl, ed. cit., 4th Edition, Vol. 9, pp. 763 et seq., or 831 et seq., or 819 et seq (1955). The iminothioether-hydrochlorides are hydrolyzed, for example, with hydrochloric acid/water.

The acylation is suitably conducted under gentle conditions, insofar as $R_5$ and $R_6$ represent free hydroxy groups in the starting compound III. If $R_5$ and $R_6$ are functionally modified hydroxy groups in the starting compound, it is possible also to operate under more vigorous conditions. In this manner of conducting the process, the OH groups of the starting compounds are preferably blocked.

Starting products of Formula III wherein an undesired acyl residue is contained as the substituent X are converted into the desired final products of the above Formula I by means of the above-mentioned acylating agents by transacylation.

In the alkylation or acylation process, it is possible to employ, in addition to the basic compounds of the above-disclosed Formula III, also the salts thereof, particularly the quaternary ammonium salts and/or optionally sulfonium salts and, in particular, the acid addition salts thereof as the starting compounds.

c. In accordance with the present invention, the starting compound employed can also be a pyridine compound of the above Formula IV. The residue $R_2$ is introduced into this compound by reaction with a mercapto compound of the above-mentioned Formula V, under approximately the same conditions as described above for the alkylation or acylation, respectively, of the starting product III.

In the starting compounds IV, Z = halogen, preferably bromine or chlorine or a sulfonic acid residue, particularly $-O-SO_2-C_6H_4CH_3$; $-O-SO_2-C_6H_4Br$; $-O-SO_2-C_6H_5$;

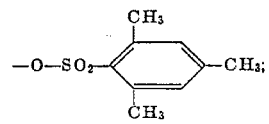

$-O-SO_2-CH_3$, the p-toluenesulfonic acid residue being preferred, or the radical of a sulfuric acid ester of the formula

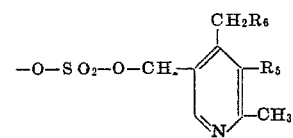

Especially preferred are starting products having the radical Z = halogen, particularly bromine or chlorine.

Suitable starting compounds IV are, for example: 5-chloro-methyl-3-hydroxy-4-hydroxymethyl-2-methyl-pyridine; 5-bromomethyl-3-hydroxy-4-hydroxymethyl-2-methyl-pyridine; 3-acetoxy-4-acetoxymethyl-5-chloro- or -5-bromomethyl-2-methyl-pyridine; 2-methyl-3-hydroxy-4-hydroxymethyl-5-p-toluenesulfonylmethyl-pyridine and the acid addition salts thereof, in particular the hydrochlorides, hydrobromides and sulfates of these compounds. The starting compounds IV are obtainable, for instance, by the halogenation of pyridoxine with $COCl_2$, $SOCl_2$, $PCl_3$ or with HBr in accordance with conventional halogenation techniques.

In this mode of operation, the compounds of the above Formula I containing the residue $R_2$ = lower acyl are produced by reacting the above-mentioned starting products IV, particularly the corresponding 5-halogenomethyl derivatives, with a thiocarboxylic acid, or a thiocarbamic acid derivative or the corresponding alkali derivatives (above Formula V wherein $R_2$ represents lower acyl). This reaction can be conducted, for example, in accordance with the conditions set forth in Houben-Weyl, ed. cit., 4th Edition, Vol. 9 (1955), pp. 749 et seq. Suitably, the reaction is accomplished in an appropriate solvent, e.g., an alcohol, especially a lower aliphatic alcohol, such as methanol, ethanol, propanol, isopropanol and n-butanol, or with dimethyl formamide. A preferred solvent is ethanol. It is advantageous to conduct the reaction in the presence of an alkali, for instance in an alcoholic potassium hydroxide solution. Generally, the process is conducted at room temperature; however, in certain cases, it is preferred to heat the reaction mixture or to boil same under reflux.

In a particularly advantageous embodiment, alcoholic potassium hydroxide solution is provided, for example, in a small excess, and the thiocarboxylic acid is then added; in this reaction, the potassium salt of the acid is formed. Then either a stoichiometric amount or an excess of the starting compound IV is added to the alkaline solution of the thiocarboxylic acid salt. The thus-obtained compound of Formula I is then isolated in a conventional manner, e.g., by extraction with a suitable solvent, such as ether and, optionally, subsequent recrystallization.

In the event the residues $R_5$ and $R_6$ represent free hydroxyl groups in the starting product IV, the thioacylation is suitably conducted under gentle conditions. If $R_5$ and $R_6$ are present in the starting product as functionally modified hydroxy groups, it is possible to operate under more vigorous conditions, for example, at an elevated temperature.

d. Compounds of Formula I can also be producted by the reduction of starting compounds of the above-mentioned Formula VI or the salts of these compounds.

For example, a starting product of the above-mentioned Formula VI containing the substituent

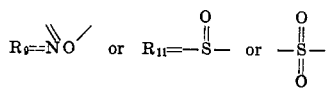

can be converted into the corresponding compounds of Formula I containing the pyridine nitrogen in the unoxidized form, or containing the desired residue $R_1 = S$, by treatment with reducing agents, such as zinc/dilute hydrochloric acid or iron/hot acetic acid or phosphorus trichloride or bromide. Preferably, the reduction is carried out by heating with ammonium sulfide or heating with phosphorus trichloride, e.g., in chloroform, or by treating with iron powder in hot acetic acid. Likewise, suitable for converting a starting product of Formula VI containing the substituent $R_9 = NO$ or $R_{11} = SO$ or $SO_2$ into a final product I containing the pyridine nitrogen in the unoxidized form, or which contains the desired residue $R_1 = S$, is a catalytic reduction with conventional catalysts, e.g., 5 percent palladium charcoal or Raney nickel in suitable solvents, such as ethanol or acetic anhydride. This reduction is conducted under conditions known from the literature, as described, for example, in Archiv Pharm. 287, 326 (1954); J. Org. Chem.18, 534 (1953); Rec. Trav. Chim. Pays-Bas 70. 581 (1951); J. Pharm. Soc., Japan 71, 1092 (1952); Houben-Weyl, "Methoden der Organischen Chemie" 4th Edition, Vol. 11/2, pp. 200 et seq., G. Thieme Publishers, Stuttgart.

In addition to the basic compounds of the above Formula VI, salts of these compounds can also be employed as starting comounds in the species (d) of the process of this invention.

Thus, it is possible, for example, to convert salts in accordance with Formula VI wherein

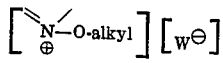

is in place of $R_9$, and

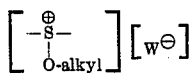

is in place of $R_{11}$ (in this connection, alkyl represents an optionally substituted alkyl residue and $W^-$ represents an equivalent of an anion, such as $Cl^-$, $Br^-$, $I^-$, 1/2 $SO''_4$), likewise by reduction, into the desired compounds I wherein $R_1 = -S-$. For this purpose, processes are employed suitable for the reduction of amine-alkoxides to amines or for the reduction of O-alkylated sulfoxides to thioethers, for example, base metals, such as zinc with acids or complex metallic hydrides, such as sodium borohydride in ethyl alcohol or tetrahydrofuran. Furthermore, such salts of compounds VI ($R_{10} = CH_2R_6$) can also be converted, by treatment with nucleophilic reagents, preferably with bases, such as aqueous alkali hydroxide or silver oxide, into the desired compounds of the above Formula I wherein $R_1 = -S-$. The conditions under which this special process can be conducted are described, for example, in J. Pharm. Soc. Japan 64, 210 (1944), or J. Org. Chem. 18, 534 (1953), as well as in J. Org. Chem. 32, 1926 (1967) and J. Org. Chem. 32, 3233 (1967).

Furthermore, in the mode of operation (d), starting products VI containing as the substituent $R_{10}$ on the pyridine ring a free or functionally modified formyl group are converted by reduction, in accordance with the processes conventional for the conversion of formyl groups into hydroxymethyl groups, into the desired final products of Formula I. Preferred starting compounds for this particular species are compounds of Formula VI wherein $R_{10}$ presents CHO. For example, the following compounds VI can be employed as the starting products: 2- methyl-3-hydroxy-4-formyl-5-methylthiomethyl-pyridine; 2-methyl-3-hydroxy-4-formyl-5-carbethoxymethylthiomethyl-pyridine; 2-methyl-3-hydroxy-4-formyl-5aminoethylthiomethyl-pyridine; and 2-methyl-3-hydroxy-4-formyl-5-dimethylaminoethylthiomethyl-pyridine. Suitable reduction agents are, e.g., complex metallic hydrides, in particular lithium aluminum hydride or sodium borohydride, base metals and acids, particularly zinc or iron/acetic acid, aluminum amalgam/water, aluminum isopropylate/isopropanol, as well as catalytically activated hydrogen. The more detailed conditions under which the reaction can be conducted are described more explicitly, for example, in Weygand-Hilgetag, pp. 154 – 169, Organisch-chemische Experimentierkunst, 3. edition, J. A. Barth-Verlag, Leipzig, 1964.

Preferred functionally modified formyl groups $R_{10}$ in the starting products VI are acetals of lower alcohols, if desired, also of araliphatic alcohols, such as benzyl alcohol. The conditions for preparing these pyridoxal acetals (compounds VI wherein $R_{10}$ represents, for example, $-CH(OC_2H_5)_2$) are described in detail, for instance in Houben-Weyl, ed. cit., Vol. 6/3 (1965), pp. 199–270. On the pyridoxal acetals, the hydroxyl group in the 5'-position can be substituted by halogen in a manner known from the literature, and the halogen subsitutent can be replaced by SH OR $-R_1-R_2$.

The splitting of these acetals with the simultaneous reduction of the 4'-carbonyl group to the 4'-hydroxy group is preferably conducted with the aid of catalytically activated hydrogen under conditions described in greater detail in Houben-Weyl, ed. cit., Vol. 6/3 (1965), pp. 277 – 278.

Insofar as substituents are present in the starting compound VI which are reducible in the residue $R_2$, for example, the residues described below under ($g_1$), these residues are optionally also reduced during process (d).

e. A pyridine derivative of the above-mentioned Formula VII can be converted into a final product of Formula I containing a hydroxy group in the 4'-position, by treatment with nitrous acid. The conditions for this reaction are described, for example, in Houben-Weyl, ed. cit., Vol. 11/2 (1958), pp. 133 – 157. For this mode of operation, compounds of Formula VII or the salts thereof are employed which contain as the substituent $R_{12}$ preferably a free amino group, or an amino group provided with a triphenyl-methyl group or with acyl residues, such as o-nitrophenyl sulfenyl, 1-adamantyloxycarbonyl or tert.-butoxycarbonyl. In this connection, starting compounds can be employed, in general, which contain on the amino residue $R_{12}$ acyl residues readily to be split off in acidic media. Optionally, when conducting this mode of reaction, it is also possible to convert an amino group contained in the side chain $R_2$' into a hydroxy group.

The following compounds are set forth as examples for the starting compounds VII:

2-methyl-3-hydroxy-4-amino-methyl-5-methylthiomethyl-pyridine,
2-methyl-3-hydroxy-4-aminomethyl-5-carbethoxymethyl-pyridine,
2-methyl-3-hydroxy-4-(o-nitrophenylsulfenyl)-aminomethyl-5-aminoethylthiomethyl-pyridine,
2-methyl-3-hydroxy-4-(1-adamantyloxycarbonyl)-amino-5-acetyl-thiomethyl-pyridine,
2-methyl-3-hydroxy-4-tritylaminomethyl-5-($\beta$-carboxy-$\beta$-amino)-ethylthiomethyl-pyridine, and
2-methyl-3-hydroxy-4-(t-butyloxycarbonyl)-aminomethyl-5-chloroethylthiomethyl-pyridine.

The starting compounds of Formula VII are obtainable, for instance, by reacting pyridoxamine with 66 percent hydrobromic acid to form 5'-bromopyridoxamine, and further reacting the latter with corresponding halogenides or azides, such as 1-adamantyloxycarbonyl chloride, trityl chloride and o-nitro-sulfenyl chloride in an aqueous solution, or e.g., with t-butyloxycarbonylazide in, for example, 50 percent aqueous dioxane, to the corresponding 5'-bromopyridoxamine substituted in the amino group. This latter compound can then be converted into the desired starting products VII by thioalkylation or thioacylation.

f. It is also possible to prepare a compound of Formula I from a 5-thiomethyl derivative of the above-mentioned Formula III herein X = H or an alkali or alkaline earth metal cation, by addition to an alkene or alkyne optionally substituted by halogen, OH, lower alkoxy, SH, lower alkylthio, optionally functionally modified carboxy and/or

If desired, the compounds III an also be added to alkenes or alkynes containing undesired substituents. The undesired substituents can be split off subsequently, or they can be converted into desired substituents.

Preferably, in this mode of operation of the process according to the invention, the mercapto compounds III are added to unsaturated carbonyl compounds; the caronyl residue can, if desired, be removed later on, or converted into a desired substituent. Particularly suitable for the addition reaction are $\alpha,\beta$-unsaturated carboxylic acids, especially lower $\alpha,\beta$-unsaturated carboxylic acids or the functional derivatives thereof, e.g., the esters or nitriles, such as acrylic acid, methyl acrylate and ethyl acrylate, acrylonitrile, methacrylic acid, methacrylate, methacrylic acid nitrile, crotonic acid, crotonitrile. Furthermore, other $\alpha,\beta$-unsaturated carbonyl compounds can also be employed, for example, $\alpha,\beta$-unsaturated ketones, such as methylvinyl ketone or $\alpha,\beta$-unsaturated aldehydes, such as acrolein, as the addition components.

Additionally, the mercapto compounds can also be added to acetylenically unsaturated hydrocarbons which are optionally substituted in a functionally suitable manner, e.g., acetylene derivatives, such as propargyl aldehyde, propargyl alcohol, propargyl halogenides, particularly propargyl chloride and bromide, vinyl acetylene, propargylic acid and the functional derivatives of propargylic acid.

Further addition components which can be employed in conjunction with the mercapto compounds III are also Schiff bases, especially Schiff bases of lower aliphatic aldehydes and lower primary or secondary alkyl amines.

Undesired substituents in the alkenes or alkynes employed for the addition reaction can be removed after the addition process, or they can be converted into desirable substituents as described below under (g).

The addition reactions of the mercapto compounds III to alkenes or alkynes are conducted in accordance with the processes set forth in Houben-Weyl, ed. cit., 4th Edition, Vol. 9, (1955), pp. 120–133. When employing this type of operation, compounds of Formula I are obtained wherein $R_2$ represents a substituted alkyl residue, optionally defined as in Formula I, but containing in the present case at least 2 carbon atoms.

(g) Compounds of Formula I or the salts thereof can also be produced by removing, in the residue $R_2$, undesired substituents or converting the latter into desired substituents and/or by hydrogenating undersired C=C double bonds or C $\equiv$ C triple bonds. Furthermore, it is possible to introduce into a residue $R_2$ any desired substituents and/or C—C unsaturated bonds which may not as yet be present therein.

$g_1$. For example, undesired halogen, hydroxy or carbonyl groups present in the residue $R_2$ can be split off or reduced to H.

The process of cleaving off an undesired halogen, e.g., the conversion of a compound of Formula I containing the residue $R_2$ = —$CH_2$-halogen, particularly —$CH_2Br$ or —$CH_2Cl$, into the corresponding compound I ($R_2 = CH_3$), can be conducted by means of the reducing agents conventionally employed for the removal of a halogen, for example, with zinc/dilute hydrochloric acid in an alcoholic solution, or with sodium in alcohols, or with sodium amalgam/water, or with complex metal hydrides, particularly lithium aluminum hydride or sodium borohydride. Halogen can be also removed by catalytic hydrogenation using conventional heavy metal or noble metal catalysts, especially palladium calcium carbonate (2.5 percent palladium content) or palladium charcoal (containing 5 percent of palladium). The conditions for this reduction are described in Weygand-Hilgetag, ed. cit., pp. 169–172,F. Zymalkowski, "Katalytische Hydrierungen im Organisch-Chemischen Laboratorium" [Catalytic Hydrogenations in the Organic-Chemical Laboratory], F.

Enke Publishers, Stuttgart, 1965, pp. 158–161; Organic syntheses, Coll. Vol. 4, p. 509, Intersciene Publishers, New York (1963); N.G. Gaylord, Reductions with Complex Metal Hydrides, Interscience Publishers, New York (1965), pp. 889–917; A. Hajos "Komplexe Hydride" (Complex Hydrides), VEB Deutscher Verlag der Wissenschaften (publisher), Berlin, 1966, pp. 219 and 276.

An undesired hydroxy group in the residue $R_2$ can be removed by reduction with base/metals/acids, particularly with zinc/acetic acid or dilute hydrochloric acid, or also catalytically, for instance under the conditions set forth in R.L. Augustine, Catalytic Hydrogenation, Techniques and Applications in Organic Symthesis, Edward Arnold Publishers, London (1965), pp. 135–139; and Weygand-Hilgetag, ed. cit., pp. 177–178.

If desired, the hydroxy group can also be removed after a preceding esterification with a sulfonic acid, particularly p-toluenesulfonic acid. For instance, the conditions can be employed herein as described in L.F. Fieser and M. Fieser, Reagents for Organic Symthesis, p. 1032, J. Wiley & Sons, Inc., New York (1967).

In case an undesired carbonyl group is present in the residue $R_2$ — particularly as a component of an aldehyde or keto grouping — such carbonyl group can be reduced in accordance with the methods customary for the reduction of carbonyl groups. A carbonyl group can be reduced, for example, in accordance with the following methods: catalytically, e.g., with platinum oxide or Raney nickel, sodium/absolute alcohol; zinc dust in an acidic or alkaline solution, and complex metal hydrides particularly lithium aluminum hydride in the presence of aluminum chloride. The conditions for this reducing process are described, for example, in Weygand-Hilgetag, ed. cit., pp. 178–181; F. Zymalkowski, "Katalytische Hydrierungen im Organisch-Chemischen Laboratorium," ed. cit., pp. 158–161; R.L. Augustine, Catalytic Hydrogenation, Techniques and Applications in Organic Synthesis, ed. cit., pp. 135–139; and A. Hajos, "Komplexe Hydride," ed.cit. (1966), pp. 295–306.

The preferred reducing agent is lithium aluminum hydride-aluminum chloride. Optionally, organotin hydrides can also be employed as the reducing agents, particularly diphenyl tin dihydride and di-n-butyl tin dihydride, as well as diphenyl silane and a trialkyl borane. The conditions for this reduction are described for instance, in A. Hajos, "Komplexe Hydride," ed. cit., pp. 288–290.

The addition of hydrogen to undesired unsaturated C—C bonds in the side chain can be accomplished with the aid of the catalysts conventionally used for hydrogenation purposes. The more detailed conditions for these reactions are set forth in R.L. Augustine, Catalytic Hydrogenation, ed.cit., pp.135–139, and F. Zymalkowski, "Katalytische Hydrierungen im Organisch-Chemischen Laboratoriam," ed. cit., pp. 158–161.

Likewise, it is possible, if desired, to saturate with hydrogen any $C \equiv C$ triple bond present in the residue $R_2$, either to the C=C double bond or to the C—C single bond. The conditions therefore are described in greater detail in the above-cited works of R.L. Augustine, pp. 135–139, and F. Zymalkowski, pp. 158–161.

Finally, it is also possible to employ chemical reducing agents for the addition of hydrogen to the undesired unsaturated bonds, e.g., base metals, particularly sodium in alcohols, sodium- or aluminum-amalgam in water, alkali or alkaline earth metals in liquid ammonia, or lithium in organic amines, as described in more detail in Weygand-Hilgetag, ed. cit., pp.116–126. Complex metal hydrides can as well be employed as the reducing agents, particularly $LiAlH_4$, $NaBH_4$, explained with respect to their use in N.G. Gaylord and Hajos, ed. cit., as well as, in particular, borohydrides, the operating guidelines for these being described in H.C. Brown, Hydroboration, New York (1962).

$g_2$. In the side chain $R_2$ of a pyridine derivative I, it is also possible, if desired, to introduce C—C unsaturated bonds by means of the methods conventional for the formation of C=C double bonds and/or $C \equiv C$ triple bonds.

For example, a C=C bond can be introduced into the residue $R_2$ containing an undesired hydroxy or alkoxy or halogen group, respectively, by splitting off water, alcohol or a hydrohalic acid, respectively from a compound of Formula I. If two identical undesired substituents are present on neighboring carbon atoms of the side chain $R_2$, a $C \equiv C$ bond can be introduced into the side chain $R_2$ by splitting off these undesired substituents.

When splitting off water, the reaction is generally conducted in an aqueous solution with the addition of sulfuric acid, potassium hydrogen sulfate, zinc chloride, phosphorus pentoxide, boric acid, oxalic acid, formic acid, acetyl chloride, Grignard reagent, or iodine, and optionally at elevated temperatures. The more detailed conditions under which these reactions can be conducted are set out, for instance, in Weygand-Hilgetag, ed.cit., pp. 782–788.

The removal of the components of a hydrohalic acid is accomplished by the use of inorganic or organic bases such as, e.g., anhydrous alkali alcoholates, solid alkali hydroxides, solutions of alkali hydroxides in water or organic solvents, alkali salts of weak acids, as well as organic bases, such as pyridine, aniline, dimethylaniline and quinoline. The conditions employed in this connection are described, for example, in Weygand-Hilgetag, ed. cit., pp. 788–790.

If the residue $R_2$ contains an other grouping in a compound of Formula I, e.g., an acetal or ketal, alcohol can be split off, with the formation of a C=C double bond, by the use of specific acidic reactants, e.g., 85 percent phosphoric acid. The conditions which can be employed herein are described in greater detail, for example, in "Organikum," 2nd Edition, VEB Deutscher Verlag der Wissenschaften (publishers), Berlin (1963), pp. 137–203, or in "Annalen der Chemie," Vol. 656, pp. 97–102 (1962).

It is also possible to obtain C=C double bonds in a side chain $R_2$ by splitting off thioethers from a tertiary sulfonium compound in accordance with conventional methods (see, in this connection, S. Patai, The Chemistry of Alkenes, Interscience Publishers, New York (1964), pp. 155 et seq.), particularly by splitting off, for instance, dimethyl sulfide from tertiary sulfonium salts, the third branch of which is the residue $R_2$.

As an example, the following reaction is set forth:

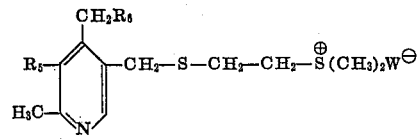

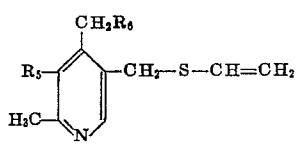

wherein $R_5$, $R_6$ and $W^-$ have the above-indicated meanings, and in place of —$CH_2$—$CH_2$—, there can also be present a longer-chain alkylene residue.

Finally, a desired double bond in the side chain $R_2$ can also be introduced by a condensation reaction wherein a compound I with a reactive functional group suitable for the conductance of the condensation reaction reacts with a second compound likewise suitable for the condensation reaction, with the formation of a double bond and simultaneous lengthening of the chain. Suitable for this purpose are primarily aldol, Knoevenagel and Wittig reactions. As the starting substances, compounds of Formula I are employed which, however, contain an undesired C=O group in the side chain $R_2$.

The reaction conditions which can be employed in this connection are described more clearly in: Houben-Weyl, ed.cit., Vol. 7/1 (1954), pp. 76–92, regarding the conductance of the aldol condensation; in G. JONES, The Knoevenagel Condensation in: Organic Reactions, Vol. 15, published by A.C. Cope, J. Wiley & Sons, New York, (1967), for the conductance of the Knoevenagel condensation; and in Johnson, Ylid Chemistry, Academic Press, New York (1965) for the conductance of the Wittig reaction.

$g_3$. Halogen residues can be introduced into the side chain $R_2$, in accordance with this invention, by the addition of hydrogen halide or halogen to C—C unsaturated bonds, or by the addition of hypohalogenite, there being introduced an OH group together with the halogen, or by halogenation of undesired OH OR C=O groups.

The addition of chlorine and bromine to a compound I with an unsaturated side chain $R_2$ is preferably conducted in an inert solvent, particularly carbon tetrachloride or chloroform, by introducing the stoichiometric amount of chlorine gas or adding the stoichiometric quantity of bromine in the same solvent. The condtions under which the reaction can be conducted are described in greater detail, for instance, in Houben-Weyl, ed. cit., Vol. 5/3 (1962), pp. 529–551, and Vol. 5/4 (1960), pp.38–100 . The conditions for the addition of hypohalic acids are found in Houben-Weyl, ed.-cit., Vol. 5/3 (1962),pp. 760–780 and Vol. 5/4 (1960), pp. 133–141 or p. 54. The operating conditions for the addition of hydrogen halides are described in greater detail in Houben-Weyl, ed. cit., Vol. 5/3 (1962), pp. 811–829 and Vol. 5/4 (1960), pp. 102–132 and 535.

Halogen residues can also be introduced by the halogenation of compounds of Formula I containing undesired OH OR C=O groups in the residue $R_2$, by substituting the OH or the oxygen of the C=O group against halogen. For such substitution reactions, a number of reactants can be employed, such as, for example, for the substitution of OH by Cl, sulfur halogenides, such as disulfur dichloride, sulfur dichloride, thionyl chloride, chlorine compounds of phosphorus and nitrogen, such as phosporus pentachloride, phosphorus trichloride, phosphorus oxychloride, nitrosyl chloride, nitryl chloride, as well as, finally, several other inorganic and organic chlorine compounds. This reaction is described in greater detail, for example, in Houben-Weyl, ed.cit., Vol. 5/3 pp. 564 et seq., for chlorine and in Vol. 5/4 of the aforementioned reference, pp. 610–629, 638 and 361–409, for bromine and iodine, as well as in Weygand-Hilgetag, ed. cit., pp. 298–323, The conversion of undesired carbonyl groups into gemdihalogenides (e.g., 1,1-dihalogenides), particularly =$CCl_2$ and =$CBr_2$, is effected by the activity of inorganic acid halogenides, particularly phosphorus halogenides, e.g., $PCl_5$ or $PBr_5$. The conditions under which the process can be conducted are explained, for example, in Weygand-Hilgetag, ed. cit., pp. 334–335, or in Houben-Weyl, ed.cit., Vol. 5/3, p. 912 and Vol. 5/4, p. 434.

$g_4$. A hydroxy group can be introduced into the residue $R_2$ of a compound I by the addition of water to undesired C—C unsaturated bonds or by the reduction of C=O groups or free or esterified COOH groups or of an epoxide group, or by the effect of H-acidic compounds on an epoxide bond.

The introduction of a hydroxyl group by the addition of water to C=C double bonds and C ≡ C triple bonds can be effected, for example, under the conditions described in greater detail in Weygand-Hilgetag, ed. cit., pp. 359–365, as well as in B.A. Krenzel, "Fortschritte der Chemie" [Advances in Chemistry] (Russ.) 20/759–775 (1951); F.A. Asinger, "Chemie und Technologie der Monoolefine" [Chemistry and Technology of the Monoolefins], Akademie Publishers, Berlin (1957); R.A. Raphael, Acetylenic Compounds in Organic Synthesis, Butterworths, London (1955); and F. Bohlmann, "Struktur und Reaktionsfahigkeit der Acetylenbindung" [Structure and Reactivity of the Acetylene Bond], Angew. Chemie (Applied Chemistry) 69,82–86 (1957).

Furthermore, hydroxy groups in the residue $R_2$ can be formed by the reduction of C=O groups. Suitable reducing agents are the reactants of the Meerwein-Ponndorf-Verley reaction, i.e., aluminum triisopropylate in absolute isopropyl alcohol, as well as complex metal hydrides, particularly $LiAlH_4$ and $NaBH_4$, and base metals together with acids, primarily zinc in acetic acid, as well as, finally, catalytically activated hydrogen, e.g., with the use of platinum oxide, platinum black and other conventional catalysts. The conditions under which the process can be conducted are set out in more detail in Weygand-Hilgetag, ed. cit., pp. 154–169, as well as "Neuere Methoden der Praparativen Organischen Chemie," edited by W. Forest, Vol. 1, pp. 137–154, Chemie Publishers, Weinheim (Bergstrasse), 3rd Edition, 1949 (Meerwein-Ponndorf-Verley reductions); in A. Hajos, ed. cit., pp. 126, 230, 240 and 279; N.G. Gaylord,ed. cit., pp. 107–124 (reductions with complex hydrides); and also in F. Zymalkowski, ed.cit., pp. 91–103; and R.L. Augustine, ed.cit., pp. 85–88 (catalytic hydrogenations of the C=O group to CHOH).

The reduction of a free or suitably functionally modified carboxy group, particularly an esterified carboxy group, in the residue $R_2$ of a compound I can also result in a desired hydroxy group. For conducting such reactions, sodium and an alcohol, e.g., ethyl or amyl alcohol or, particularly, complex metal hydrides, can be employed. The conditions that can be utilized in this connection are described in more detail in Organic Syntheses, ed. cit., Coll. Vol. II, pp. 154 and 372, as well as Coll. Vol. III, p. 671, and in N.G. Gaylord, ed.cit., pp. 322–638, as well as A. Hajos, ed. cit., pp. 158, 258, 285, 298, 310 and 349. Also suitable is a process utilized for the reduction of carboxy groups to OH groups, i.e., catalytic hydrogenation, in particular with copper-chromium oxides (copper chromite) or Raney nickel. In this connection, the process can be conducted according to the conditions set forth in Weygand-Hilgetag, ed. cit., pp. 184–187.

It is also possible to introduce into the residue $R_2$ of a compound I an OH group by the reduction of an epoxide grouping in the residue $R_2$, e.g., with base metals and dilute acids, but especially with complex metal hydrides. More elaborate details for conducting such reactions are described in N.G. Gaylord, ed. cit., pp. 646–673 and A. Hajos, ed.cit., pp. 149–155. It is further possible to split the epoxide ring by compounds containing active hydrogen whereby the ring opening results, with a lengthening of the side chain, in the compounds of this invention having an OH-substituted residue $R_2$. If desired, it is possible during this reaction to additionally introduce other functional groups into the residue $R_2$ at the same time.

For example, by the effect of an alcohol on an undesired epoxide bond in the residue $R_2$ of a compound I, an OR group is formed with splitting of the epoxide ring, with the simultaneous introduction of an alkoxy residue into the substituent $R_2$. Additional suitable reactants for the formation of a hydroxy group from an epoxide bond are mercaptans, amines, carboxylic acids or Grignard reagents.

$g_5$. An alkoxy group can be introduced into the residue $R_2$ of a compound I by the addition of an alcohol to an undesired C=C double bond or C≡C triple bond in the residue $R_2$. In this connection, the conditions are utilized set forth in greater detail in Weygand-Hilgetag, ed. cit., pp. 372–376. Optionally, it is also possible to convert a hydroxy group already present in the residue $R_2$ into an alkoxy group, by alkylation under the conditions described in mode of operation (b) above or in Houben-Weyl, ed. cit., Vol. 6/3, pp. 10–49.

$g_6$. An SH or -S-alkyl group can be introduced into the residue $R_2$ in a compound of the above Formula I by addition of hydrogen sulfide or a mercaptan to an undesired C—C double or triple bond contained in the residue $R_2$, or by reduction of an undesired sulfur-oxygen function contained in the residue $R_2$ — this mode of operation leading to SH groups. More detailed conditions for the addition reaction are described in greater detail in the process (f) above, and in Houben-Weyl, ed. cit., Vol. 9. (1955), pp. 120–134.

In the reduction of an undesired sulfur-oxygen function, i.e., a higher oxidation stage of the sulfur in the residue $R_2$, a starting compound is selected, for example, of Formula I. but which contains an $SO_3H$ group, particularly in the esterified form; sulfonic acid halogenide or anhydride residues; or, for instance, a sulfinic acid group $-SO_2H$. Suitable reducing agents include base metals with acids, and especially complex metal hydrides, the use of which is more specifically described in N.G. Gaylord, ed. cit., pp. 851–875.

$g_7$. An optionally alkylated amino group can be introduced into the residue $R_2$ by treating a compound of Formula I containing undesired halogen or OH in the residue $R_2$, with ammonia or hexamethylenetetramine or an amine; or by addition of amino compounds to undesired C—C unsaturated bonds; or by the reduction of undesired residues —CN, $-NO_2$, =NOH, $-NHNH_2$, —NO, in the residue $R_2$.

In the reaction with ammonia, hexamethylenetetramine or primary or secondary amines, the conventional conditions of an N-alkylation are observed. Preferably, compounds of Formula I are employed as the starting materials which are substituted in the residue $R_2$ by I or also by Br. When introducing an unsubstituted $NH_2$ group, an at least ten-fold excess of ammonia is employed, and the solvents used in this connection are generally alcohols, particularly methanol or ethanol.

The substitution of an undesired halogen by an amino group in the residue $R_2$ of a compound I can also be accomplished with the aid of the Gabriel method with the use of potassium phthalimide. A detailed description of the method used herein is found in Weygand-Hilgetag, ed. cit., pp. 516–529, as well as in Houben-Weyl, ed. cit., Vol. 11/1 (1955), pp. 24–96.

Furthermore, it is possible, in the compounds of Formula I in the residue $R_2$, to substitute undesired hydroxy groups by amino, alkylamino or dialkylamino groups. In this connection, conditions are employed which are set out in detail in Houben-Weyl, ed. cit., Vol. 11/1 (1955), pp. 108–236.

If the residue $R_2$ contains undesired C—C unsaturated bonds, particularly in conjugation with respect to activating groups, such as, e.g., the formyl, keto, sulfone, nitro or carbalkoxy group, then it is also possible to produce the amino groups in the residue $R_2$ by the addition to such unsaturated bonds, of suitable components, e.g., ammonia, primary and secondary amines, as well as those of a cyclic character, such as, e.g., piperidine, piperazine or ethylenimine, to these C—C unsaturated bonds. The more specific conditions under which these reactions are carried out are described in greater detail in Houben-Weyl, ed.cit., Vol. 11/1 (1955) pp. 267–341.

Furthermore, an $—N—R_3R_4$ group in the residue $R_2$ can be obtained by reducing a compound of Formula I containing additionally in the residue $R_2$ undesired groups reducible to amino, alkylamino or dialkylamino residues, especially —CN, $-NO_2$, —NO, =N—OH or — $NHNH_2$ groups. In this connection, reducing agents are employed which are conventionally utilized for such reduction processes, in particular sodium amalgam, sodium in alcohol, other base metals, e.g., zinc, with acids, sodium dithionite or complex metal hydrides, more detail being given in Houben-Weyl, ed.-cit., Vol. 11/1, pp. 341–730.

$g_8$. A carboxy group can be introduced into the residue $R_2$ of a compound I by oxidation of undesired substituents, particularly formyl groups and primary alcoholic hydroxy groups, or by hydrolysis of a functionally modified COOH group, or by other synthesis methods conventional for the formation of COOH.

Thus, it is possible to introduce a carboxy group into the residue $R_2$ by oxidizing suitable undesired substituents in the residue $R_2$, starting with compounds optionally protected in the 3- and 4'-positions of the pyridine ring. All conventional oxidizing agents can be employed, more detailed conditions being described in Weygand-Hilgetag, ed. cit., pp. 405–407, and in Houben-Weyl, ed.cit., Vol. 8(1952), pp. 407–414.

If the residue $R_2$ already contains an undesired functionally modified carboxy group, it is possible to liberate therefrom a carboxy group by the use of saponifying agents. Functional derivatives are, in particular, acid nitriles, esters, amides, hydrazides, amidines, the acid halogenides and the hydroxamic acids, and reaction conditions for these conversion reactions are described in greater detail in Houben-Weyl, ed. cit., Vol. 8 (1952), pp. 418–433.

Carboxy groups can also be introduced into the side chain by aceto-ethyl acetate and malonic acid syntheses, by the conversion of ketones; by splitting nitro compounds, by carbon chain formation; and rearrangement reactions, as described in greater detail in Houben-Weyl, ed. cit., Vol. 8 (1952), pp. 433–462.

$g_9$. If desired, free or functionally modified carboxy groups in the residue $R_2$ of a compound I can be further functionally modified.

In particular, free COOH groups or carboxylic acid halogenides can be converted into esters, amides, anhydrides or other functional derivatives. It is also possible to convert esters into amides.

For the esterification of a free COOH group in the residue $R_2$ of a compound I, known processes are employed, including but not limited to, esterification with diazoalkanes, or reaction with alkali alcoholates (Williamson synthesis), additional details being given in Houben-Weyl, ed.cit., Vol. 8 (1952), pp. 508–628.

For amidation, or for the introduction of the other N-derivatives, there are employed reactive functional derivatives of the carboxyl group in the residue $R_2$, primarily the esters, anhydrides and halogenides. The conditions under which it is possible to operate when preparing such functional N-derivatives of the carboxy group are described specifically in Houben-Weyl, ed.-cit., Vol. 8 (1952), pp. 653–706.

When the products obtained by the above-described processes (b) — (g) have the hydroxy residues $R_5$ and $R_6$ still protected, these protective groups are split off subsequent to the main process stages (b) to (g). For liberating these protected hydroxy groups, the conditions are employed as described in mode of operation (a). In this connection, the acidic and/or alkaline agents used for splitting off the protective groups are employed preferably in diluted form.

It is further possible to optionally convert compounds of Formula I wherein $R_1$ represents S into the corresponding final products containing the residue

by treatment with oxidation agents conventionally employed for the conversion of thioethers into sulfoxides. Preferred oxidation agents are hydrogen peroxide, sodium metaperiodate, peracids, such as monoperphthalic acid or chromium trioxide in acids, e.g., in 75 percent acetic acid, or t-butyl hypochlorite. The oxidation is suitably conducted under the following conditions:

The compounds I wherein $R_1 = S$ are dissolved in glacial acetic acid and allowed to stand with the stoichiometric amount of 30 percent $H_2O_2$ several hours at 0° C or also at room temperature. The oxidation of compounds I wherein $R_1 = S$ with sodium periodate is advantageously conducted in a water/methanol mixture at room temperature. For the oxidation with peracids, temperatures are employed ranging between −20° C and +20° C, and preferred solvents used are acetone or chloroform. The conditions under which the oxidation with t-butyl hypochlorite can be conducted are described in greater detail in J. Org. Chem., Vol. 32 (10), 3111 (1967).

A final product of Formula I can be converted into the acid addition salt thereof by means of an acid in the usual manner. For this reaction, those acids are suitable which yield physiologically acceptable salts. Thus, suitable acids are, for example, organic and inorganic acids, such as, e.g., aliphatic, alicyclic, araliphatic, aromatic or heterocyclic mono- or polybasic carboxylic or sulfonic acids, including but not limited to, formic, acetic, propionic, pivalic, diethylacetic, succinic, pimelic, fumaric, maleic, lactic, tartaric, malic acid; aminocarboxylic acids; sulfamic, benzoic, salicylic, phenylpropionic, citric, gluconic, ascorbic, isonicotinic, methanesulfonic,ethanedisulfonic, 8-hydroxyethanesulfonic, p-toluenesulfonic acid; naphthalene-mono- and -disulfonic acids, sulfuric acid, or hydrobromic acid, or phosphoric acids, such as orthophosphoric acid, etc. In this connection, mineral acids are preferred, such as hydrochloric acid or sulfuric acid.

It is also possible, if desired, to convert compounds of Formula I into the quaternary ammonium salts thereof and/or the tertiary sulfonium salts thereof. This conversion is conducted with conventional alkylating agents (called in the description below "N,S-dialkylation" and "N- or S-monoalkylation," respectively). The alkylation can be conducted, for example, with alkyl halogenides, preferably with lower alkyl halogenides, in particular the iodides, such as methyl iodide, ethyl iodide, propyl iodide, allyl iodide, or also with benzyl iodide. If desired, it is also possible to subsequently replace an undesired halogenide ion, e.g., $I^-$ by a desired halogenide ion, e.g., $Cl^-$ or $Br^-$ by way of ion exchange techniques well known in the art. Sulfuric acid esters or sulfonic acid esters are likewise suitable for the reaction.

The formation of quaternary ammonium or tertiary sulfonium salts can be conducted in the optional presence of a solvent. Especially suitable solvents are those having a high dielectric constant, such as chloroform or nitro compounds, such as nitrobenzene or nitromethane, or cyano compounds, such as acetonitrile, or if desired, benzyl alcohol. Though the reactions are normally conducted at room temperature, higher temperatures can also be employed.

The rapidly reacting agents used for producing quaternary compounds, for example the alkyl iodides, are suitably added in an equimolar proportion; whereas, less reactive alkylating agents, for example an alkyl chloride, are advantageously employed in excess.

If desired, it is also possible to alkylate selectively. For example, the N-alkylation of the compounds of Formula I can also be accomplished with less reactive alkylating agents.

Generally, for the production of quaternary ammonium and/or tertiary sulfonium slats of the compounds of Formula I, alkylating agents are preferred which contain a lower alkyl residue, particularly a methyl residue. By reacting a compound I wherein $R_1 = S$ and $R_2 = CH_3$ with methyl iodide, for example, the compound 2-methyl-3-hydroxy-4-hydroxymethyl-5-methylthiomethyl-pyridinium iodide is obtained.

Aside from the formation of the above salts, a compound of Formula I can also be liberated from a corresponding ammonium and/or sulfonium salt. This reaction is effected by the addition of nucleophilic reactants, particularly bases, in an inert solvent, or by the addition of a basic-reacting solvent.

As suitable nucleophilic reactants, bases are preferred, including but not limited to: alkali mercaptides, such as sodium or potassium mercaptides which can optionally be substituted by a hydrocarbon residue, e.g., methyl, ethyl or benzyl, sodium or potassium mercaptide; alkali thiosulfates, such as sodium or potassium thiosulfates; ammonia or amines, particularly aliphatic amines liquid at room temperature, such as ethyl, propyl or benzylamine, and especially ethanolamine. The reaction can be conducted in the optional presence of an inert solvent, including but not limited to, alcohols, particularly lower alcohols, such as methanol, ethanol, propanol, isopropanol; or acetone; or methyl ethyl ketone.

Further details of reaction conditions are found, for example, in Houben-Weyl, ed.cit., Vol. 11/1 (1957), pp. 966–991, and in "Chemische Berichte" [Chemical Reports], Vol. 90, 305 and 403 (1957).

Similarly, it is also possible to liberate a compound of Formula I from an undesired acid addition salt by treatment with an alkaline reagent, especially an alkali hydroxide, such as sodium or potassium hydroxide, or with an alkaline-reacting salt, such as an alkali carbonate, e.g., sodium or potassium carbonate. If desired, this liberated compound of Formula I can then again be converted into another desired acid addition salt. The compounds of Formula I cam be employed in a mixture with conventional pharmaceutical excipients and, if desired, together with other active substances. Carrier substances can be such organic or inorganic substances suitable for parenteral, enteral, or topical application, and which, of course, do not deleteriously react with the novel compounds, such as, for example, water, vegetable oils, polyethylene glycols, gelatin, lactose, amylose, magnesium stearate, talc, vaseline, cholesterol, etc.

For parenteral application, particularly suitable are solutions, preferably oily or aqueous solutions, as well as suspensions, emulsions, or implants. Ampoules are convenient unit dosages.

For enteral application, particularly suitable are tablets or dragees which are also characterized by talc and/or a carbohydrate carrier or binder or the like, the carbohydrate carrier being preferably lactose and/or corn starch and/or potato starch. A syrup or the like can also be used wherein a sweetened vehicle is employed.

For topical application, viscous to semi-solid forms are used such as liniments, salves, or creams, which are, if desired, sterilized, or mixed with auxiliary agents, such as preservatives, stabilizers, or wetting agents, or salts for influencing the osmotic pressure, or with buffer substances.

The compounds of this invention are administered to animals, e.g., mammals, in therapeutically effective amounts, e.g., amounts effective to increase animal tolerance to oxygen defiency, in preferred dosages of 1 – 500 mg per dosage unit, the dosage per kg ratio being about 0.1 to 50 mg per kg. In general, the amount of carrier varies from 1 – 5,000 mg and the preferred dosage is about 100 mg active compound.

Aside from the details of how to use the compounds of this invention, as previously set forth, they can be used, generally speaking, in the same manner as the known cysteine, used as protective substance against high intensity radiation or the known bis-(3-hydroxy-4-hydroxymethyl-2-methyl-pyridyl-(5)-methyl)-disulfide used as effective compound for curing cerebral disfunctions.

The protective effect against high intensity radiation may be evaluated with the method, published in "Strahlentherapie," Volume 107, (1958) page 121–126. The curing effect for combatting cerebral disfunctions may be evaluated for example with the methods published in Medicine Experimentalis, Vol. 7, (1962) pages 144 – 154 and Deutsche Zeitschrift fur Nervenheilkunde, Vol. 188, (1966), p. 200 – 209.

The administered dosages of the compounds according to the invention are about the same as those which are generally administered for cysteine or bis-(3-hydroxy-4-hydroxymethyl-2-methyl-pyridyl-(5)-methyl)-disulfide.

Without further elaboration, it is believed that one s-killed in the art can, using the preceding description, utilize the present invention to its fullest extent. The following preferred specific embodiments are, therefore, to be construed as merely illustrative, and not limitative, of the remainder of the specification and claims in any way whatsoever.

EXAMPLE 1

11 g. of 5-hydroxy-4-hydroxymethyl-3-mercaptomethyl-6-methyl-pyridine hydrochloride is added to a solution of 6.2 g. KOH in 100 ml of methanol, and mixed with 7 g. of methyl iodide. After allowing the reaction solution to stand overnight, it is concentrated, mixed with water, and extracted with ethyl acetate. The solution is dried over $Na_2SO_4$, and the solvent is evaporated. The residue, consisting of 5-hydroxy-4-hydroxymethyl-3-methylthiomethyl-6-methyl-pyridine after recrystallization from alcohol, melts at 135° C. Yield: 8.7 g. of hydrochloride, m.p. 155° C. (decomposition)

EXAMPLE 2

In a solution of 1,000 ml. of water and 250 ml. of 2N NaOH, 110 g. of 5-hydroxy-4-hydroxymethyl-3-mercaptomethyl-6-methylpyridine hydrochloride is dissolved and, under stirring, 63 g. of dimethyl sulfate and 250 ml. of 2N NaOH are added dropwise at the same time so that the pH of the solution is between 7 and 7.5. The temperature of the solution ranges between 20 and 25° C. After 5 hours of agitation, the precipitated 5-hydroxy-4-hydroxymethyl-3-methylthiomethyl-6-methyl-pyridine is vacuum filtered and, after being dried in a desiccator, is treated with alcoholic HCl. The thus-precipitated hydrochloride is vacuum filtered and recrystallized from alcohol/ether; m.p. 154°–155° C. (decomposition).

EXAMPLE 3

20 g. of methyl p-toluenesulfonate is dissolved in 220 ml. of methanol containing 8 g. of NaOH, then mixed with 22 g. of 5-hydroxy-4-hydroxymethyl-3-mercaptomethyl-6-methyl-pyridine hydrochloride and allowed to stand for 12 hours at room temperature. The solution is concentrated under vacuum, mixed with water, and extracted with ethyl acetate. The solution is dried over $Na_2SO_4$, and the residue obtained after the solvent has been evaporated is treated with alcoholic HCl. The thus-precipitated 5-hydroxy-4-hydroxymethyl-3-methylthiomethyl-6-methyl-pyridine hydrochloride is vacuum filtered and recrystallized from alcohol/ether; m.p. 154–155° C (decomposition).

EXAMPLE 4

To a solution of sodium mercaptide in methanol (produced by the introduction of $CH_3SH$ into a solution of 2.3 g. of sodium in 40 ml of methanol), a solution of 18.7 g. of 3-chloromethyl-5-hydroxy-4-hydroxymethyl-6-methyl-pyridine in 200 ml of methanol is slowly added and then refluxed for one-half hour. The NaCl which separates is vacuum filtered, and the filtrate is concentrated by evaporation. The residue is treated with alcoholic HCl, and the thus-precipitated 5-hydroxy-4-hydroxymethyl-3-methylthiomethyl-6-methyl-pyridine hydrochloride is vacuum filtered; m.p. 153°–154° C (decomposition).

EXAMPLE 5

A solution of 0.5 g. of sodium in 50 ml of isopropanol is mixed with 2.3 g. of dimethyl aminoethyl mercaptan and thereafter with 5 g. of 3-bromomethyl-5-hydroxy-4-hydroxymethyl-6-methylpyridine. After heating the reaction mixture for 1 hour to 60° C, the thus-precipitated NaBr is vacuum filtered, and HCl is introduced into the filtrate until a weakly acidic reaction is obtained. After adding 5 ml. of ether, the 3-dimethylaminoethylthiomethyl-5-hydroxy-4-hydroxymethyl-6-methyl-pyridine dihydrochloride precipitates. The substance is vacuum filtered and recrystallized from methanol/ether; m.p. 200° C (decomposition).

EXAMPLE 6

To a solution of 1.2 g. of sodium in 100 ml. of isopropanol, 9.2 g. of 5-hydroxy-4-hydroxymethyl-3-mercaptomethyl-6-methyl-pyridine and 7 g. of n-butyl bromide are added. After refluxing the reaction mixture for 1½ hours, it is vacuum filtered from the precipitated NaBr, and HCl is introduced into the filtrate. The thus-precipitated 3-n-butylthiomethyl-5-hydroxy-4-hydroxymethyl-6-methyl-pyridine hydrochloride is then vacuum filtered and redissolved from alcohol/ether; m.p. 124° C.

EXAMPLE 7

A solution of 35 g. of cysteine · HCl · $H_2O$ in 50 ml of water is heated to 40° C. Simultaneously, there are added 37.5 g. of 3-chloromethyl-5-hydroxy-4-hydroxymethyl-6-methyl-pyridine in batches and a solution of 22.4 g. of KOH in 30 ml. of water. During this reaction step, the temperature increases to 68° C. After 40 minutes, the reaction mixture is cooled, and the thus-precipitated residue is vacuum filtered. For purification purposes, this precipitate is dissolved in 80 ml of 2N HCl and the pH of the solution is adjusted to 5.5 by means of 2N NaOH. The S-[5-hydroxy-4-hydroxymethyl-6-methyl-pyridyl-(3)-methyl]-cysteine precipitated overnight is vacuum filtered, washed with water and methanol, and dried in a desiccator; m.p. 230° C (decomposition).

EXAMPLE 8

A solution of 22 g. of 5-hydroxy-4-hydroxymethyl-3-mercaptomethyl-6-methyl-pyridine hydrochloride in 20 ml of water is mixed with 10 ml of 35 percent formaldehyde solution. The 5-hydroxy-4-hydroxymethyl-3-hydroxymethylthiomethyl-6-methyl-pyridine hydrochloride precipitated after allowing the reaction mixture to stand for 12 hours is vacuum filtered and recrystallized from methanol; m.p. 157° C.

EXAMPLE 9

Analogously to Example 6, S-[5-hydroxy-4-hydroxymethyl-6-methyl-pyridyl-(3)-methyl]-thioacetic acid ethyl ester is produced by reacting 5-hydroxy-4-hydroxymethyl-3-mercaptomethyl-6-methyl-pyridine with ethyl chloroacetate; m.p. 96° C (alcohol); hydrochloride, m.p. 175° C (alcohol/ether).

EXAMPLE 10

Analogously to Example 1, 3-allythiomethyl-5-hydroxy-4-hydroxymethyl-6-methyl-pyridine is prepared by reacting 5-hydroxy-4-hydroxymethyl-3-mercaptomethyl-6-methyl-pyridine hydrochloride with allyl bromide; m.p. 111° C (ethyl acetate/hexane); hydrochloride, m.p. 136° C.

EXAMPLE 11

Analogously to Example 1, 5-hydroxy-4-hydroxymethyl-6-methyl-3-propargylthiomethyl-pyridine is produced by reacting 5-hydroxy-4-hydroxymethyl-3-mercaptomethyl-6-methyl-pyridine with propargyl chloride; m.p. 140° C (ethyl acetate/hexane); hydrochloride, m.p. 135° C.

EXAMPLE 12

1.4 g. of 5-hydroxy-4-hydroxymethyl-3-methylthiomethyl-6-methyl-pyridine hydrochloride is allowed to stand in 30 ml of glacial acetic acid with 0.8 ml of 30 percent $H_2O_2$ at room temperature for 48 hours. The solvent is evaporated under vacuum, and the thus-precipitated 5-hydroxy-4-hydroxymethyl-3-methylsulfinylmethyl-6-methyl-pyridine hydrochloride is recrystallized from alcohol/ether; m.p. 179° C.

EXAMPLE 13

To a solution of 23.5 g. of sodium metaperiodate in 200 ml of water cooled to 0° C is added 21 g. of 3-ethylthiomethyl-5-hydroxy-4-hydroxymethyl-6-methyl-pyridine in 50 ml of methanol. The precipitated substance is vacuum filtered, and the filtrate extracted with ethyl acetate. The solvent is dried over $Na_2SO_4$ and evaporated under vacuum. The residue is treated with alcoholic HCl; the thus-precipitated 3-ethylsulfinylmethyl-5-hydroxy-4-hydroxymethyl-6-methyl-pyridine hydrochloride is vacuum filtered and recrystallized from alcohol/ether; m.p. 143° C.

EXAMPLE 14

6.6 g. of 5-hydroxy-4-hydroxymethyl-3-methylthiomethyl-6-methyl-pyridine is mixed, in a mixture of 50 ml. of tetrahydrofuran and 80 ml of acetone, at −10° to −15° C, with a solution of 6.1 g. of monoperphthalic acid in 180 ml of ether, cooled to −15° C. After 24 hours, the solvent is removed by evaporation. The residue is extracted with chloroform and filtered off from undissolved phthalic acid. The residue obtained after the chloroform has been evaporated is treated with alcoholic HCl; the thus-precipitated 5-hydroxy-4-hydroxymethyl-3-methylsulfinylmethyl-6-methylpyridine hydrochloride is vacuum filtered and recrystallized from alcohol/ether; m.p. 178–179° C.

EXAMPLE 15

5 g. of 5-hydroxy-4-hydroxymethyl-3-methylthiomethyl-6-methyl-pyridine is heated in 30 ml of 75 percent acetic acid to 80° C; thereafter, a solution of 2 g. of $CrO_3$ in 6 ml of water is added dropwise. The temperature of the reaction mixture is maintained at 70°–80° C for 1 hour. Then, the mixture is concentrated under vacuum, mixed with water, and continuously extracted with ethyl acetate. The ethyl acetate extract is dried over $Na_2SO_4$, concentrated by evaporation, and the residue treated with alcoholic HCl. The thus-precipitated 5-hydroxy-4-hydroxymethyl-3-methylsulfinylmethyl-6-methyl-pyridine hydrochloride is vacuum filtered and recrystallized from alcohol/ether; m.p. 179° C.

EXAMPLE 16

Analogously to Example 12, 3-allylsulfinylmethyl-5-hydroxy-4-hydroxymethyl-6-methyl-pyridine hydrochloride is produced by reacting 3-allythiomethyl-5-hydroxy-4-hydroxymethyl-6-methyl-pyridine hydrochloride with 30 percent $H_2O_2$; m.p. 140° C (decomposition) (alcohol/ether).

EXAMPLE 17

Analogously to Example 12, 5-hydroxy-4-hydroxymethyl-6-methyl-3-propargylsulfinylmethyl-pyridine hydrochloride is prepared by reacting 5-hydroxy-4-hydroxymethyl-6-methyl-3-propargylthiomethyl-pyridine hydrochloride with 30 percent $H_2O_2$; m.p. 158° C (decomposition) (methanol/ether).

EXAMPLE 18

9 g. of 2-methyl-3-hydroxy-4-hydroxymethyl-5-mercapto-methyl-pyridine is dissolved in an excess of acetic anhydride; several ml of anhydrous pyridine are added; and the reaction mixture is allowed to stand overnight in a cooled water bath. The thus-cooled reaction product is mixed with water, acidified to a pH of 2-3, and heated for 30 minutes to 60°–80° C. After cooling, the aqueous phase is extracted with ether in an extractor. The dried ether solution is freed of the solvent by allowing an appropriate amount of boiling absolute alcohol to flow into the solution. HCl is introduced into the cooled, alcoholic solution, and after standing overnight, 2-methyl-3-hydroxy-4-hydroxymethyl-5-acetylthiomethyl-pyridine hydrochloride is crystallized from the reaction mixture. Yield: 85 percent of theory. M.p.: 160° C. after recrystallization from alcohol-ether.

EXAMPLE 19

In a round flask, 9.24 g. of isopropylidene-5'-thiopyridoxine is dissolved in 200 ml of ether and mixed with an ether-diazomethane solution until the yellow color persists. After 1 hour, the excess of diazomethane is removed by the dropwise addition of dilute acetic acid, and the solvent is thereupon evaporated. The residue is mixed with 100 ml of 0.01N hydrochloric or sulfuric acid or another mineral acid and heated on a steam bath for 30 minutes. After cooling, the reaction mixture is extracted several times with ethyl acetate, dried, the solvent removed by evaporation, and the remaining substance mixed with HCl-saturated, dry alcohol. When allowing the reaction mixture to stand overnight, 2-methyl-3-hydroxy-4-hydroxymethyl-5-methylthiomethyl-pyridine hydrochloride crystallizes. Yield: 87 percent of theory; m.p. 155° C.

EXAMPLE 20

A solution of 1.7 g. of lauric acid chloride in 5 ml of chloroform is added dropwise to a solution of 2.0 g of isopropylidene-5'-thiopyridoxine HCl in 20 ml of chloroform and 10 ml. of pyridine. After allowing the reaction mixture to stand overnight, it is first washed with water in a separatory funnel and then with 0.5N HCl. The separated chloroform phase is dried and concentrated by evaporation. The oily residue (2 g.) is boiled under reflux with 20 ml of water, 40 ml of alcohol and 8 ml of N HCl for 10 minutes, and then freed of the solvent under vacuum. The residue crystallizes upon treatment with isopropyl ether. After recrystallization from ethyl acetate/alcohol, the 2-methyl-3-hydroxy-4-hydroxymethyl-5-laurylthiomethyl-pyridine melts at 118°–119° C. By stirring together with alcoholic HCl, the hydrochloride is obtained, m.p. 125° C.

EXAMPLE 21

11 g. of 2-methyl-3-hydroxy-4-hydroxymethyl-5-thiomethylpyridine hydrochloride is added to a solution of 6.2 g. of potassium hydroxide in 150 ml of methanol, and then mixed with 8.5 g. of β-methylthioethyl bromide. The reaction mixture is heated for 2 hours in a steam bath and substantially freed of the solvent. The residue is extracted with ethyl acetate. The combined ethyl acetate phases are dried over sodium sulfate and then removed by evaporation. After mixing with alcoholic hydrochloric acid, and allowing the reaction mixture to stand overnight, 2-methyl-3-hydroxy-4-hydroxymethyl-5-(β-methylthioethylthiomethyl)-pyridine crystallizes as the hydrochloride.

EXAMPLE 22

In the course of 1 hour, a cooled solution of 6.1 g. of ethylene sulfide in alcohol is added dropwise to a well stirred and ice-cooled solution of 18.5 g. of 2-methyl-3-hydroxy-4-hydroxymethyl-5-thiomethyl-pyridine in a mixture of 2.5 g. of sodium and 200 ml. of absolute alcohol; thereafter, the reaction mixture is stirred at room temperature for another hour. The residue is acidified with acetic acid, and dry hydrogen chloride is introduced, whereupon, after allowing the reaction mixture to stand in a refrigerator overnight 2-methyl-3hydroxy-4-hydroxymethyl-5-(thioethylthiomethyl)-pyridine crystallizes.

EXAMPLE 23

Under stirring and ice-cooling, 60 g. of 2-methyl-3-hydroxy-4-hydroxymethyl-5-thiomethyl-pyridine are introduced batchwise into 180 ml of ethylenimine in such a manner that the temperature does not exceed +10° C. After terminating the addition, the reaction mixture is stirred under cooling for another 2 hours. The thus-precipitated reaction product is vacuum filtered, washed with either (m.p. of the base: 156°–158° C) and coverted, by suspending the reaction product in alcoholic hydrochloric acid, into the hydrochloride of 2-methyl-3-hydroxy-4-hydroxymethyl-5-(β-aminoethyl)-thiomethyl-pyridine, which melts at 212°C after recrystallization from methanol/ether.

EXAMPLE 24

22 g. of 2-methyl-3-hydroxy-4-hydroxymethyl-5-thiomethylpyridine hydrochloride is suspended in 200 ml of ethanol; under stirring, 12.4 g. of potassium hydroxide is added thereto. The stirring is continued for another hour, and then the reaction mixture is filtered and the filtrate thereafter mixed with 17 g. of isopropyl iodide. After allowing the reaction mixture to stand overnight, it is vacuum filtered from the thus-precipitated potassium iodide. The filtrate is evaporated under vacuum, and the residue disolved in alcoholic hydrochloric acid. The thus-obtained crude 2-methyl-3-hydroxy-4-hydroxymethyl-5-(isopropylthiomethyl)-pyridine hydrochloride melts, after recrystallization from methanol/ether, at 135°–136° C. Yield: 21 g.

EXAMPLE 25

To a solution of 29 g. of KOH in 300 ml of methanol, 39.6 g. of thioacetic acid is added. Under ice-cooling, 68 g. of isopropylidene-5'-chloropyridoxine · HCl is then introduced into the solution, and the reaction mixture is allowed to stand overnight. The thus-precipitated potassium chloride is vacuum filtered on a glass frit, and the filtrate evaporated under vacuum. From the filtrate residue, mixed with alcoholic HCl and ether, there crystallizes 70 g. or 96 percent of theory of 3,4'-isopropylidene-5-acetylthiomethylpyridoxine as the hydrochloride, m.p. 180° C.

In order to split off the isopropylidene group, the residue of the vacuum evaporation step is mixed with 300 ml of 0.01N sulfuric acid and heated on a steam bath for 30 minutes. The cooled solution is extracted with ether; the ether solution is dried and then evaporated. The residue of the evaporation is mixed with alcoholic HCl and allowed to stand overnight in a regrigerator. Yield: 76 percent of theory of 2-methyl-3-hydroxy-4-hydroxymethyl-5-acetylthiomethyl-pyridine hydrochloride, m.p. 160° C.

EXAMPLE 26

8 g. of 2-methyl-3-hydroxy-4-hydroxymethyl-5-methylsulfinylmethyl-pyridine-N-oxide is dissolved in glacial acetic acid; then, with gentle heating on a water bath, 24 g. of zinc dust is introduced into the reaction solution. After the evolution of hydrogen has terminated, the reaction mixture is agitated, with heating to 100° C, for another 24 hours. After cooling, the reaction mixture is filtered off from the excess zinc dust, and the glacial acetic acid is evaporated. The residue is extracted several times with hot absolute alcohol. After cooling and the subsequent introduction of dry hydrogen chloride, 2-methyl-3-hydroxy-4-hydroxymethyl-5-methylthiomethyl-pyridine crystallizes in the form of the hydrochloride; m.p. 155° C (decomposition).

EXAMPLE 27

18.1 g. of 2-methyl-3-hydroxy-4-(1-adamantyloxycarbonyl)-amino-5-thiomethyl-pyridine is dissolved in 50 percent dioxane. Thereafter, an equivalent amount (5.11 g.) of pivalic acid (2,2,2-trimethylacetic acid) is added, where upon 10.35 g. of dicyclohexyl carbodiimide, dissolved in 45 ml of 50 percent dioxane, is added dropwise under stirring. After 4 hours, the reaction mixture is filtered from the thus-separated dicyclohexylurea, and the solvent is removed by evaporation under vacuum at a temperature which is as low as possible. The crude 2-methyl-3-hydroxy-4-(1-adamantyl-oxycarbonyl)-amino-5-pivalylthiomethyl-pyridine remaining as the residue is taken up in 2N hydrochloric acid, and then 11 g. of soldium nitrite is introduced. After the evolution of nitrogen has ended, the reaction mixture is stirred for another hour at room temperture and then extracted with ethyl acetate. The dried solution is freed of the solvent, and the residue is taken up in ethanolic hydrochloric acid. Upon allowing the reaction mixture to stand overnight in a refrigerator, 2-methyl-3-hydroxy-4-hydroxymethyl-5-pivalylthiomethyl-pyridine hydrochloride crystallizes.

EXAMPLE 28

To a solution of 18.5 g. of 2-methyl-3-hydroxy-4-hydroxymethyl-5-thiomethyl-pyridine in 4 g. of sodium-methylate-containing absolute ethanol, there is added dropwise under stirring within 2 hours 10.1 g. of methyl acrylate in such gradual a manner that, optically by external cooling, the temperature in the reaction vessel can be maintained at 50° C ± 5° C. After the addition step is terminated, the reaction mixture is additionally heated under stirring for 2 hours at 50° C in order to complete the reaction. Then, the reaction mixture is cooled, filtered if necessary, and concentrated by evaporation to about one-third of the original volume; then, the solution is saturated with dry hydrogen chloride. The thus-precipitated mixture of sodium chloride and ester hydrochloride is washed with as small an amount of water as possible, to remove the sodium chloride; then, the reaction mixture is recrystalized from alcoholic hydrochloric acid. Thus, the pure 2-methyl-3-hydroxy-4-hydroxymethyl-(5-carbomethoxyethylthiomethyl)-pyridine · HCl is obtained.

EXAMPLE 29

8.7 g. of vinyl actate is mixed, batchwise and under ice-cooling, with 18.5 g. of 2-methyl-3-hydroxy-4-hydroxymethyl-5-thiomethyl-pyridine. After the reaction mixture is allowed to stand overnight, the reaction mixture is triturated with ether to form a precipitate. The latter is vacuum filtered, washed with ether, and recrystallized from ethanol. methanol. thus-obtained 2-methyl-3-hydroxy-4-hydroxymethyl-5-($\beta$-acetoxyethylthiomethyl)-pyridine melts at 224° C.

EXAMPLE 30

2 g. of 2-methyl-3-hydroxy-4-hydroxymethyl-5-methylthiomethyl-pyridine is dissolved in 30 ml of acetonitrile. The solution is allowed to stand for 3 days with 1.5 g. of methyl iodide and is then filtered off from any precipitate. The filtate is concentrated. The crystals which separate after allowing the concentrated filtrate to stand overnight in a refrigerator are vacuum filtered and washed with a small quantity of cold methanol. After recrystallization from methanol, the thus-obtained 2-methyl-3-hydroxy-hydroxymethyl-5-methylthiomethyl-pyridinium iodide melts at 165°C. Yield: 0.8 g.

EXAMPLE 31 a. 10 g 5-mercaptomethyl-2,2-8-trimethyl-4H-m-dioxino [4,5-c] pyridinehydrochloride were dissolved in 100 ml pyridine and 100 ml of acetic anhydride were added. After 12 hours the precipitated pyridine hydrochloride was filtered off, the volatile components were distilled off and after trituration with ether the residue was crystallized. There was obtained 5-acetyl-mercaptomethyl-2,2-8-trimethyl-4H-m-dioxino [4,5-c] pyridine; base M.P. = 150° C; hydrochloride: M.P. = 189°–190° C (from alcoholic hydrochloric acid with ether). Quantitative yield.

b. Heating with 0.01 N $H_2SO_4$ (respectively HCl) during 10 minutes to 100° C, yields after neutralization, 85 percent of crude 5-hydroxy-4-hydroxymethyl-3-acetylthiomethyl-6-methylpyridine; M.P. = 144° C (from methanol).

EXAMPLE 32 a. To a solution of 7 g KOH in 200 ml methanol there are added successively 16 g 5-mercaptomethyl-2,2-8-trimethyl-4H-m-dioxino [4,5-c] pyridinhydrochloride and 8.7 g methyl iodide and the reaction mixture was left to stand for 12 hours at 20° C. After addition of 1 liter water, extraction in the cold with ethyl acetate and drying over sodium sulfate the liquid was evaporated and the residue was converted by treatment with alcoholic hydrochloric acid to 13.6 g (85 percent) of 5-methylthiomethyl-2,2-8-trimethyl-4H-m-dioxino [4,5-c] pyridinhydrochloride; M.P. = 186° C.

By heating the compound obtained under a) with 1 N HCl (half an hour, 100° C) and evaporation of the volatile components there was obtained in a quantitative manner 5-hydroxy-4-hydroxymethyl-3-methyl-thiomethyl-6-methylpyridinehydrochloride; M.P. = 154°–155° C (dec. (from ethanol/ether) ).

EXAMPLE 33 a. 4 g 5-[(2-chloroethyl)-thiomethyl]2,2-8-trimethyl-4H-m-dioxino [4,5-c] pyridinehydrochloride where inserted together with 50ml benzene and 50 ml condensed anhydrous dimethyl-amine into a carius tube which was closed by smelting, and heated in a tube oven during 10 hours to a temperature between 60° and 70° C. After cooling and opening of the carius tube the dimethylamino hydrochloride was filtered off and the liquid was evaporated. There was obtained 5-[(2-dimethylaminoethyl)thiomethyl]-2,2-8-trimethyl-4H-m-dioxino-[4,5-c] pyridine.

b. The residue obtained according to a) was heated together with 100 ml N HCl during 25 minutes to 100° C and the solution was concentrated by evaporation. There was obtained 5-hydroxy-4-hydroxymethyl-3[(2-dimethylamino)ethyl]-thiomethyl-6-methylpyridine-dihydrochloride. M.P. = 195°–196° C (from ethanol hydrochloric acid).

EXAMPLE 34

A quantity of 70 ml of 1 N HCl was poured over 5.76 g of (5-acetoxy-4-acetoxymethyl-3-methylthiomethyl-6-methyl)pyridine and heated during 30 minutes on a steam bath. All volatile components were distilled off from the still hot solution. A residue consisting of 5-hydroxy-4-hydroxymethyl-3-methylthiomethyl-6-methyl-pyridinehydrochloride was obtained, quantitative yield, M.P. = 155° C (dec).

EXAMPLE 35

A quantity of 3.14 g of 5-[(2-Nitroethyl) thiomethyl-]-2,2-8-trimethyl-4H-m-dioxino [4,5-c]-pyridine -N-oxide were dissolved in 150 ml of absolute methanol and hydrated at room temperature under atmospheric pressure on 0.3 g platinum dioxide till take up of hydrogen ceased. After filtering off the catalyst and evaporatiion, the residue was recrystallized from alcoholic hydrochloric acid. There was obtained a 95 percent yield of 5-hydroxy-4-hydroxymethyl-3-[(2-aminoethyl)thiomethyl]-6-methyl-pyridinedihydrochloride of M.P. = 212° C.

EXAMPLE 36

A quantity of 18.5 g 5-hydroxy-4-hydroxymethyl-3-mercaptomethyl-6-methyl-pyridine was added to a solution of 6.2 g potassium hydroxide and 7.85 ml of 3-chloropropionitril and left at 20° C during 12 hours. After removal of the solvent the residue was extracted with ethyl acetate. There was obtained 5-hydroxy-4-hydroxymethyl-3-[(2-cyanethyl)thiomethyl]-6-methylpyridine M.P. = 150° C (from ethyl/acetate). Yield: 21.9 g (92 percent).

EXAMPLE 37

To a solution of 9.2 g of 5-hydroxy-4-hydroxymethyl-3-mercaptomethyl-6-methylpyridine and 3.1 g KOH in 50 ml methanol there was added 7.65 g to ethoxyethylbromide. The reaction mixture was stirred during 12 hours. The solid components were sucked off and extracted with ethyl acetate. The filtrate and the ethyl acetate extracts were united and concentrated by removal of solvent. There was obtained 5-hydroxy-4-hyroxymethyl-3-[(2-ethoxy)ethylthiomethyl]-6-methylpyridine. M.P. = 99° C (from ethyl acetate). Yield: 78.2 percent.

EXAMPLE 38

9.25 g of 5-hydroxy-4-hydroxymethyl-3-mercaptomethyl-6-methylpyridine were dissolved in a mixture of 3.1 g KOH in 75 ml methanol and 4.73 g of 1-chloropropan-2-ol were added. The reaction mixture was heated during 2 hours to 100° C. After leaving to stand during 12 hours at 20° C it was filtered off, concentrated by evaporation and extracted with ethyl acetate. Upon cooling there precipitated 9 g (74 percent) of 5-hydroxy-4-hydroxymethyl-3-[(2-hydroxy-n-propyl)-thiomethyl-6-methyl]pyridine M.P. = 97°–99° C. (from isopropylalcohol/ether and ethyl acetate/isopropylether).

EXAMPLE 39

9.25 g of 5-hydroxy-4-hydroxymethyl-3-mercaptomethyl-6-methyl-pyridine were dissolved in a mixture of 3.1 g KOH in 75 ml methanol and 6.83 g of 6-chloro-n-hexanol-(1) were added. After heating for 2 hours at 100° filtration and removal of solvents the residue was extracted with ethyl acetate. After evaporation there was obtained 11.1 g (78 percent) of 5-hydroxy-4-hydroxymethyl-3-[(6-hydroxy-n-hexyl)-thiomethyl -6-methylpyridine M.P. = 195° C (decomposition, from isopropanol).

EXAMPLE 40

4.7 g of 5-hydroxy-4-hydroxymethyl-3-mercaptomethyl-6-methyl-pyridine were mixed with 8.6 g of maleic acid diethylester and after addition of 50 ml of sodium methylate heated during 1 hour to 100° C. Upon cooling, there precipitated a crystalline precipitate, which was dissolved in acetic acid and filtered. From the filtrate there precipitated upon addition of hexane 5-hydroxy-4-hydroxymethyl-3-[(1,2-diethoxycarbonyl)-ethyl-thiomethyl -6-methylpyridine, M.P. = 103° C (from ethyl acetate/hexane) Yield: 7.7 g (87 percent).

EXAMPLE 41

In an analogous manner to Example 40 there was obtained from 4.7 g of 5-hydroxy-4-hydroxymethyl-3- mercaptomethyl-6-methylpyridine and 5.7 g crotonic acid ethyl ester by heating during 4 hours 6.3 g (85 percent) of 5-hydroxy-4-hydroxymethyl-3-[(1-methyl-2-ethoxycarbonyl)-ethylthiomethyl]-6-methylpyridine M.P. = 78° C (ethyl acetate/hexane).

EXAMPLE 42

0.63 g Sodium were dissolved in 50 ml absolute ethanol and there were added simultaneously 2.7 g of 3-mercapto-1,2- propandiol and 4.7 g of 5-hydroxy-4-hydroxymethyl-3-chlormethyl-6-methyl-pyridine.
After heating during 1 hour at 100° C the reaction mixture was cooled, sodium chloride was filtered off and liquids were evaporated. The residue was taken up in isopropylanol, precipitated from ether and the necessary quantity of alcoholic hydrochloric acid was added in order to dissolve the precipitate. After filtration the solvent was evaporated, the residual oil comprises chromatographic pure 5-hydroxy-4-hydroxymethyl-3-[(2,3-dihydroxy)-propyl]-thiomethyl-6 -methylpyridine. Yield: 4.7 g (72 percent) M.P. of the hydrochloride: 105° C.

EXAMPLE 43

28 g of 5-hydroxy-4-hydroxymethyl-3-mercaptomethyl-6-methylpyridine were suspended in 120 ml acrylonitrile and with stirring there was added a small quantity of sodium methoxide, where upon the temperature rose to about 50° C. The reaction mixture was stirred during 2 hours, where upon the addition product crystallized out. After vacuum filtration, the adhering acrylonitrile was washed out with ether. There was obtained 5-hydroxy-4-hydroxymethyl-3-[2-cyanoethyl-(1)]-thiomethyl-6-methylpyridine, M.P. = 155°–156° C (from methanol); Yield: 30 g.

EXAMPLE 44

In the solution of 25 g sodium in 100 ml methanol there was added 200 g laurylmercaptan and 187 g 5-hydroxy-4-hydroxymethyl-3-chlormethyl-6-methylpyridine. After half an hour of heating the reaction mixture was filtered off from precipitated sodium chloride while still hot. From the filtrate there was obtained after cooling 296 g of 5-hydroxy-4-hydroxymethyl-3-(n-dodecylthiomethyl)-6-methylpyridine M.P. = 81° C (84 percent) from isopropylether.

Analogously there was prepared from the reaction of 5-hydroxy-4-hydroxymethyl-3-chloro (respectively bromo)methyl-6-methylpyridine with pentanethiol-1, hexanethiol-(1), heptanthiol-(1), octanethiol-(1), nonanethiol-(1), decanthiol-(1), hexadecanthiol-(1), octadecanthiol-(1) respectively eicosanthiol-(1) in a suitable solvent, the following compounds:
5-Hydroxy-4-hydroxymethyl-3-(pentylthiomethyl)-6-methyl-pyridine hydrochloride, M.P. = 105°–106° C.
5-Hydroxy-4-hydroxymethyl-3-(hexylthiomethyl)-6-methyl-pyridine-hydrochloride, M.P. = 108° C.
5-Hydroxy-4-hydroxymethyl-3-(heptylthiomethyl)-6-methyl-pyridine-hydrochloride, M.P. = 120° C.
5-Hydroxy-4-hydroxymethyl-3-(octylthiomethyl)-6-methyl-pyridine-hydrochloride, M.P. = 127° C.
5-Hydroxy-4-hydroxymethyl-3-(nonylthiomethyl)-6-methyl-pyridine-hydrochloride, M.P. = 128° C.
5-Hydroxy-4-hydroxymethyl-3-(decylthiomethyl)-6-methyl-pyridine, M.P. = 80° C.
5-Hydroxy-4-hydroxymethyl-3-(hexadecylthiomethyl)-6-methyl-pyridine, M.P. 94° C.
5-Hydroxy-4-hydroxymethyl-3-(octadecylthiomethyl)-6-methyl-pyridine, M.P. 98° C.
5-Hydroxy-4-hydroxymethyl-3-(eikosylthiomethyl)-6-methyl-pyridine, M.P. = 104° C.

EXAMPLE 45

18,2 g 5-tosyloxymethyl-2,2-8-trimethyl-4H-m-dioxino [4,5-c] pyridine were dissolved in 300 ml absolute dimethylformamide and a quantity of 3.5 g sodium methyl mercaptide were added. The reaction mixture was heated during 12 hours on a steam bath; thereafter the dimethylformamide were distilled off. The residue was slurried with water and vacuum filtered. The residue was subsequently heated during 30 minutes with 1 n HCl on a steam bath, evaporated till dry and recrystallized from alcoholic hydrochloric acid. Yield of 5-hydroxy-4-hydroxy-methyl-3-methylthiomethyl-6-methyl-pyridine-hydrochloride (62percent) M.P. 155° C (dec).

EXAMPLE 46

3.85 g of 5-methylthiomethyl-2,2-8-trimethyl-4H-m-dioxino [4,5-c] pyridinium-N-methoxy-iodide were heated with 2 N NaOH on a steam bath, acidified, boiled for 10 minutes under reflux, cooled, adjusted to pH 7 and there precipitate was extracted with ethyl acetate. After evaporation there remained 0.8 9 of 5-hydroxy-4-hydroxymethyl-3-methylthiomethyl-6-methylpyridine which was recrystallized from a little methanol, M.P. = 135° C.

EXAMPLE 47

2.13 g 5-hydroxy-4-formyl-3-methylthiomethyl-6-methylpyridine-N-oxide were dissolved in 100 ml methanol and hydrated on PtO$_2$ until take up of hydrogen ceased. After filtering off the catalyst the solvent was evaporated and the residue was crystallized from alcoholic hydrochloric acid. Yield 92 percent of 5-hydroxy-4-hydroxymethyl-3-methylthiomethyl-6-methyl-pyridine-hydrochloride, M.P. = 155° C (dec.).

EXAMPLE 48

4.54 g of 5-methylthiomethyl-4-hydroxy-8-methyl-4H-m-dioxino [4,5-c] pyridine were dissolved in glacial acetic acid and fresh zinc dust was added gradually with shaking until the solution became colorless. It was left for a few hours under refrigeration, the solids were vacuum filtered and the filtrate was evaporated. The residue was dissolved in water, dissolved zinc was precipitated by introduction of H$_2$S, filtered off and the residue crystallized from alcohlic hydrochloride acid, resulting in a yield of 4.1 g of 5-hydroxy-4-hydroxymethyl-6-methyl-3-methylthiomethyl-pyridine hydrochloride, M.P. = 154°–155° C (dec).

EXAMPLE 49

2.8 g 5-hydroxy-4-formyl-3-[(2-chlorpropyl)thiomethyl]-6-methylpyridine-N-oxide were reduced in tetrahydrofuran as solvent with an excessive LiAlH$_1$4, as described in Example 61, but without the use of AlCl$_3$, and worked up. Yield 5-hydroxy-4-hydroxymethyl-3-propylthiomethyl-6-methylpyridine 58 percent, M.P. = 93°–94° C (after recrystallization from ethyl acetate/hexane).

EXAMPLE 50

4.68 g of 5-hydroxy-4-(tritylaminomethyl)-3-propylthiomethyl-6methylpyridine were dissolved in 100 ml of 20 percent hydrochloric acid and 0.77 g sodium nitrite were added. The reaction mixture was stirred for 24 hours and evaporated till dry. The residue was taken up in water and filtered off from undissolved components. The filtrate was adjusted to pH 7 and the precipitate was vacuum filtered and crystallized, after drying, from ethyl acetate/hexane, M.P. = 94° C, Yield: 67 percent 5-hydroxy-4-hydroxymethyl-6-methyl-3-propylthiomethylpyridine.

EXAMPLE 51

9.25 g of 5-hydroxy-4-hydroxymethyl-3-mercaptomethyl-6-methylpyridine were mixed intimately with 6.05 g allylbromide. A small quantity of benzoyl-peroxide was added and the mixture was heated for a number of hours on a steam bath. Thus formed residue could not be crystallized, but it is a uniform compound as evident from thin-layer-chromatography NMR-spectrum: no allyl protons at 3,8-4 and 5-6.4 ppm; 3 $CH_2$-groups in the side chain at 2,0-3,5 ppm. The 5-hydroxy-4-hydroxymethyl-3-[(bromopropyl)thiomethyl]-6-methylpyridine was obtained in a quantitative yield.

EXAMPLE 52

In a manner analogous to Example 51 there was obtained the corresponding 5-hydroxy-4-hydroxymethyl-3-[(3-hydroxypropyl) thiomethyl]-6-methylpyridine as pale yellow oil formed by the addition of allyl alcohol. NMR-spectrum: no allyl protons at 3.8-4; and 5-6.4 ppm; 3 $CH_2$-groups in the side chain at 2.0-3.5ppm.

EXAMPLE 53

Analogous to Example 52 there was obtained 5-hydroxy-4-hydroxymethyl-3-[(3-mercaptopropyl)thiomethyl]-6-methylpyridine as pale yellow oil by the addition of allyl mercaptan. Signals of $CH_2$-groups at 1.5 and 2.9 ppm in the NMR-spectrum.

EXAMPLE 54

Analogous to Example 52 there was obtained 5-hydroxy-4-hydroxymethyl-3-[(2-carboxyethyl)thiomethyl]-6-methylpyridine by addition of acrylic acid, M.P. = 155° C (from glacial acetic acid).

EXAMPLE 55

In an analogous manner to Example 52 there was obtained 5-hydroxy-4-hydroxymethyl-3-[(2-dimethyl-aminoethyl)thiomethyl]- 6 methylpyridine-dihydrochloride by addition of vinyl-dimethylamine. M.P. = 195° C (from ethanol, HCl/ether).

EXAMPLE 56

2.25 g of 5-hydroxy-4-hydroxymethyl-3-allylthiomethyl-6-methylpyridine in 100 ml methanol were hydrated on 4 g palladium-charcoal (5percent) at 6 atmospheres, filtered and evaporated. Trituration with hexane results in the crystallization of 5-hydroxy-4-hydroxymethyl-3-n-propylthiomethyl-6-methylpyridine which was obtained in quantitative yield, M.P. = 94° C (from ethyl acetate/hexane).

EXAMPLE 57

2.23 g of 5-hydroxy-4-hydroxymethyl-3-propargyl-thiomethyl-6-methlpyridine in 600 ml ethyl acetate were hydrated on 2 g 5 percent palladium/charcoal at 20° C and at 1 atmosphere pressure; the catalyst was added in 6 equal portions until an uptake of about 0.01 mole of hydrogen had taken place. After filtration and evaporation there was obtained 5-hydroxy-4-hydroxymethyl-3-allyl-thiomethyl-6-methylpyridine; M.P. = 111° C (from ethylacetate hexane). Yield 90 percent.

EXAMPLE 58

2.23 g 5-hydroxy-4-hydroxymethyl-3-propargylthiomethyl-6-methylpyridine in 600 ml ethylacetate were hydrated at 20° C at 1 atmosphere on 15 g 5 percent palladium charcoal until uptake of hydrogen ceased. Uptake: 0.02 moles hydrogen. After filtration and evaporation there was obtained 5-hydroxy-4-hydroxymethyl-3-propyl-thiomethyl-6-methylpyridin-hydrochloride, quantitative yield; M.P. = 138° C (from methanolic hydrochloric acid).

EXAMPLE 59

A quantity of 2.6 g of 5-hydroxymethylthiomethyl-2,2-8-trimethyl-4H-m-dioxino [4,5-c] pyridine are suspended in ether and there were added stoichiometric quantities of tosylchloride and triethylamine and the reaction mixture was stirred during a number of hours. The precipitate was carefully filtered off under vacuum. The filtrate was added to an etheric solution of an excess of $LiAlH_4$ so that the solvent remains at a slight boil. Further working up is according to Example 61. Yield: 1.2 g of 5-hydroxy-4-hydroxymethyl-3-methylthiomethyl-6-methylpyridine; M.P. = 135° C.

EXAMPLE 60

4.6 g of 5-hydroxy-4-hydroxymethyl-3-chloromethylthiomethyl-6-methylpyridine were dissolved in 50 ml concentrated hydrochloric acid and there were added 2 g of zinc dust in small portions. The reaction mixture was stirred until the entire zinc dust was dissolved and then the reaction mixture was concentrated by evaporation. The residue was dissolved in water the dissolved zinc c was precipitated by introducing hydrogen sulfide. After filtration the filtrate was evaporated and the residue recyrstallized from alcoholic hydrochloric acid. Yield 3.9 g 5-hydroxy-4-hydroxymethyl-3-methylthiomethyl-6-methylpyridin-hydro-chloride; M.P. = 155° C (dec.).

EXAMPLE 61

2.41 g of 5-hydroxy-4-hydroxymethyl-3-[(2-oxopropyl)-thiomethyl]-6-methylpyridine were suspended in 30 ml ether and a solution of 0.42 g of $LiAlH_4$ in 20 ml ether was added dropwise. After 30 minutes a suspension of 1.46 g $AlCl_3$ in 20 ml ether was added and the reaction mixture was boiled during 1 hour under reflux. After cooling there was added carefully a quantity of 2 ml of water and 2 ml of 20 percent $H_2SO_4$ and the ether was decanted. To the remaining crystalline mass there was added a quantity of water so as to obtain a clear solution. After neutralization, evaporation, the residue was extracted with absolute methanol. After the removal of the methanol there remained a residue which was recrystallized from ethyl acetate/hexane. Yield 1.52 g 5-hydroxy-4-hydroxymethyl-3-propylthiomethyl-6-methyl-pyridine, M.P. = 94° C.

EXAMPLE 62

4.86 g of 5-hydroxy-4-hydroxymethyl-3-[(2-hydroxypropyl)thiomethyl]-6-methylpyridine were dissolved in 50 ml of 85 percent phosphoric acid and the mixture was heated during a number of hours on a steam bath. The hot mixture was poured on 100 g of ice and the pH value was adjusted after cooling to a value of 7.0. The precipitated 5-hydroxy-4-hydroxymethyl-3-allylthiomethyl-6-methylpyridine was sucked off and recrystallized from ethylacetate hexane. Yield 65 percent, M.P. = 111° C.

EXAMPLE 63

Analogous to Example 62 there was obtained from (2-Chloro-propyl)thiomethylderivative the 3-allylthiomethyl-pyridine compound in 73 percent yield by heating with dicyclohexylamine under reflux.

EXAMPLE 64

To 5.3 g acetone there were added 20 ml dioxan and afterwards a small quantity of KOH dissolved in methanol. During 1 day there was added dropwise, with good stirring, a solution of 7.3 g of 5-hydroxy-4-hydroxymethyl-3-[(3-oxopropyl)-thiomethyl]-6-methylpyridine in dioxan while the temperature of the reaction mixture was maintained below 15° C. Afterwards the reaction mixture was stirred at room temperature overnight. After neutralization with acetic acid, 80 mg solid iodine were added and the mixture was heated on a steam bath. The solution was reduced to a small volume and was poured into a 10-fold quantity of water. The pH was adjusted to 7. The oily precipitate of 5-hydroxy-4-hydroxymethyl-3-[(5-oxo-hex-3-en)thiomethyl]-6-methylpyridine was introduced into a separating funnel and separated by extraction. The UV-spectrum shows the typical absorption for unsaturated carbonyl compounds at 225 nm.

EXAMPLE 65

4.5 g of 5-hydroxy-4-hydroxymethyl-3-allylthiomethyl-6-methylpyridine were dissolved in glacial acetic acid and cooled to −5° C. A stoichiometric quantity of hydrogen bromide in glacial acetic acid was added with stirring and under thorough cooling. After stirring for a further hour the volatile components were removed under a high vacuum without additional heating. The desired 5-hydroxy-4-hydroxymethyl-3-[(2-bromopropyl)thiomethyl]-6-methylpyridine remained as in oil. NMR spectrum: allyl protone disappeared at 3-3.2 and 4.8-6.1 ppm.

EXAMPLE 66

4.5 g of 5-hydroxy-4-hydroxymethyl-3-allylthiomethyl-6-methylpyridine were dissolved in 100 ml chloroform and there was added dropwise a solution of 3.2 g bromine in 50 ml chloroform. Stirring was continued at room temperature until the last residual coloration due to the bromine disappeared. Afterwards the solution was reduced in volume by evaporation. The desired 5-hydroxy-4-hydroxymethyl-3-[(2,3-dibromopropyl)thiomethyl]-6-methylpyridine remains as an oil. Quantitative yield. MNR spectrum: allyl protons disappeared at 3-3.2 and 4.8-6.1 ppm.

EXAMPLE 67

5-hydroxy-4-hydroxymethyl-3-allylthiomethyl-6-methylpyridine was supsended in water and there was added such a quantity of dilute sulphuric acid until it was dissolved. A stoichiometic quantity of N-bromoacetamide was added until all solids were dissolved. When approaching a pH value of 6.5 to 6.8 there is precipitated the desired 5-hydroxy-4-hydroxymethyl-3-[(3-hydroxy-2-bromopropyl)thiomethyl]-6-methylpyridine in the form of an oil which can be separated. Yield: 52 percent. NMR spectrum: allyl-protons disappeared at 3-3.2 and 4.8 to 6.1 ppm.

EXAMPLE 68

6 ml absolute tetrahydrofuran were carefully mixed with 3 g thionylchloride and after cooling to 10° C there was added portionwise 3 g of 5-hydroxy-4-hydroxymethyl-3-[(3-hydroxy)-butyl-(1)-thiomethyl]-6-methylpyridine. After stirring for two hours the reaction mixture was concentrated by evaporation. The desired 5-hydroxy-4-hydroxymethyl-3-[(3-chloro)-but-(1)-yl-thiomethyl]-6-methylpyridine remains as a non crystallizing oil. The NMR sepctrum corresponds to the structure. Analysis: Cl-calculated: 12.9 percent; found: 13.1 percent.

EXAMPLE 69

To a suspension of 1.14 g LiAlH$_4$ in 150 ml absolute tetrahydrofuran there was added under nitrogen a suspension of 8.13 g of 5-hydroxy-4-hydroxymethyl-3-[(4-oxa-3-oxo-pentyl-(1)]-thiomethyl-6-methylpyridine at such a rate that the solution boiled slightly. After boiling a further 3 hours it was decomposed with 3 ml of ethyl acetate and water. The solid lithium salts were vacuum filtered and boiled a number of times with absolute ethanol. After evaporation of the solvent there was obtained 4.95 g (68 percent) of a slightly yellow oil, 5-hydroxy-4-hydroxymethyl-3-[3-hydroxypropyl-(1)]thiomethyl-6-methylpyridine the ester bonds in the infrared spectrum (1,710–1,735 cm$^{-1}$) disappeared and the NMR sepctrum shows 6 protons in the side chain.

EXAMPLE 70

5-Hydroxy-4-hydroxymethyl-3-allylthiomethyl-6-methylpyridine was dissolved in 35 percent sulphuric acid and shaken overnight under a nitrogen atmosphere. The solution was neutralized at a temperature not exceeding 5° (pH-electrode) and evaporated at an as low as possible temperature (high vacuum). From the residue the base was extracted with ethyl acetate or methanol. After evaporation of the solvent there remained 5-hydroxy-4-hydroxymethyl-3-[(2-hydroxypropyl)thiomethyl]-6-methylpyridine as oil, yield 66 percent. Crystallizes from ethyl acetate/isopropylether after prolonged standing, M.P. = 97°–99° C.

EXAMPLE 71

10 g of 5-Hydroxy-4-hydroxymethyl-3-[(3-oxobutyl)thiomethyl]-6-methylpyridine were dissolved in 250 ml methanol and 1.5 g NaBH$_4$, whereupon it was first heated during 2 hours on a steam bath. Small quantities of NaBH$_4$ were added until thin layer-chromatography controls showed that the starting material had disappeared. After concentration to a small volume, water was added and the pH was adjusted to 7. The precipitate was filtered, dried and crystallized from an ethyl acetate/hexane mixture. M.P. = 110° C (dec.). Yield of 5-hydroxy-4-hydroxymethyl-3-[(3-hydroxy-butyl)thiomethyl]thiomethyl]-6-methylpyridine 72 percent. The IR spectrum does not show any carbonyl bonds.

EXAMPLE 72

Into a solution of 0.02 moles sodium ethylate in 100 ml absolute ethanol there was introduced gradually a stoichiometric quantity of 5-hydroxy-4-hydroxymethyl-3-vinylthiomethyl-6-methylpyridine and stirred for a number of hours. After neutralization with ethanolic hydrochloric acid, filtration and evaporation of the solvents the residue was extracted with ethyl acetate and the residue recrystallized from ethyl acetate. Yield 71 percent of 5-hydroxy-4-hydroxymethyl-3-[(2-ethoxy-ethyl)-thiomethyl]-6-methylpyridine. M.P. = 99° C.

EXAMPLE 73

To a solution of 0.02 moles of 5-hydroxy-4-hydroxymethyl-3-vinylthiomethyl-6-methylpyridine in dioxan there was added, after addition of a small quantity of sodium methylate, hydrogen sulfide gas till saturation, and further stirred for a number of hours under a nitrogen atmosphere. After neutralization with a few drops of methanolic hydrochloric acid and evaporation the residue was recrystallized from methanol yielding the desired 5-hydroxy-4-hydroxymethyl-3-(mercaptoethylthiomethyl)-6-methylpyridine. M.P. = 184° C, yield 57 percent.

EXAMPLE 74

To a solution of 10.55 g of 5-hydroxy-4-hydroxymethyl-3-vinyl-thiomethyl-6-methylpyridine in dioxan there was added 0.5 g of sodium methylate and from a gas container there was added methyl mercaptane. After saturation stirring was continued for a further 12 hours at room temperature, neutralized with methanolic hydrochloric acid, filtered, evaporated and the residue was purified by crystallization from methanol, M.P. = 118° C, Yield 8.8 g of 5-hydroxy-4-hydroxymethyl-3-methylthioethylthiomethyl-6-methylpyridine.

EXAMPLE 75

3.95 g 5-acetoxy-4-acetoxymethyl-3-[(2-chlorsulfonylethyl)-thiomethyl]-6-methylpyridine were reduced in tetrahydrofuran with an excess of LiAlH$_4$ under a protective atmosphere of nitrogen. The excess of the reagent was destroyed with ethyl acetate and water. The solid components were dissolved in concentrated hydrochloric acid, evaporated till dry, and extracted with absolute alcohol. By introducing further hydrogen chloride gas and additon of ether the 5-hydroxy-4-hydroxymethyl-3-[(2-thioethyl)thiomethyl]-6-methylpyridinhydrochloride was precipitated. Yield 72 percent M.P. of the base: 184° C.

EXAMPLE 76

2 g of 5-[(2-chloroethylthiomethyl)]-2,2-8-trimethyl-4H-m-dioxino [4,5-c] pyridine-hydrochloride with 200 ml concentrated ammonia and 4 g ammonia chloride were closed and heated in a carius tube in a tube oven overnight at 100° C. After filtering off the undissolved components, evaporation took place, concentrated hydrochloric acid was added and again evaporated. The residue was boiled a number of times with absolute alcohol and again evaporated. Recrystallization of the residue from methanol/ether yields 1.1 g of 3-aminoethylthiomethyl-4-hydroxymethyl-5-hydroxy-6-methyl-pyridine-dihydrochloride, M.P. = 212° C.

EXAMPLE 77

6.48 g of 5-[(2-chloroethyl)-thiomethyl[-2,2-8-trimethyl-4H-m-dioxino [4,5-c] pyridinhydrochloride were heated together with 150 ml anhydrous benzene and 100 g di-n-butylamin in a glass pressure vessel at a 100° C during 16 hours. Undissolved matter was filtered off the filtrate was concentrated, concentrated hydrochloric acid was added and heated during 30 minutes on a steam bath. After evaporation till dry, the residue was extracted with absolute ethanol. The unified extracts were evaporated. Yield 6.7 g of 2-methyl-3-hydroxy-4-hydroxymethyl-5-[(2-dibutylamino)-ethylthiomethyl]-pyridinedihydrochloride M.P. 176° C (from methanol/ether).

Example 78

To a suspension of 1.9 g of LiAlH$_4$ and 250 ml absolute tetrahydrofuran there was added with stirring a suspension of 12 g 5-hydroxy-4-hydroxymethyl-3-[(2-cyanoethyl)-thiomethyl]-6-methylpyridine in 200 ml absolute tetrahydrofuran. After stirring for 3 hours at 20° C then unreacted LiHlH$_4$ was destroyed by addition of ethyl acetate and water. After evaporation the residue was slurried with water, vacuum filtered and to the filtarate there was added 25 percent HCl and again evaporated. The dry residue was extracted with absolute ethanol and the unified extracts were evaporated. There was obtained 8.3 g of 5-hydroxy-4-hydroxymethyl-3-[(3-aminopropyl)-thiomethyl]-6-methyl-pyridine-dihydrochloride M.P. = 176° C (from acetone/ethanol).

EXAMPLE 79

2.58 g of 5-hydroxy-4-hydroxymethyl-3-[(2-nitroethyl) thiomethyl]-6-methylpyridine in 80 ml absolute tetrahydrofuran were added dropwise to suspension of 0.72 g LiAlH$_4$ in such manner that the solvent boils slightly under reflux, it was boiled for a further 3 hours and the solvent was distilled off. The residue was slurried with as little water, vacuum filtered and the filtrate was acidified with 25 percent HCl and again evaporated. The dry residue was extracted with absolute alcohol. The unified extracts were evaporated and the remaining residue recrystallized from methanol/ether. M.P. = 212° C; or base: 156°–158° C. Yield 85 percent of 5-hydroxy-4-hydroxymethyl-3-[(2-aminoethyl)thiomethyl]-6-methylpyridinedihydrochloride. methylpyridinedihydrochloride.

EXAMPLE 80

Analogous to Example 79 there was reduced a quantity of 2.42 g of 5-hydroxy-4-hydroxymethyl-3-[(2-nitroso-ethyl)thiomethyl]-6methylpyridine to the 3-aminoethyl-thiomethyl compound. Yield 76 percent.

EXAMPLE 81

Analogus to Example 79 there was reduced a quantity of 2.5 of 5-hydroxy-4-hydroxymethyl-3-[(3-oximino-propyl)-thio methyl]-6-methylpyridine to yield 5-hydroxy-4-hydroxymethyl-3-[(3-aminopropyl)thiomethyl]-6-methylpyridine-dihydrochloride M.P. = 176° C, Yield 78 percent.

EXAMPLE 82

5 g of 5-hydroxy-4-hydroxymethyl-3-(ethoxycarbonylmethyl)-thiomethyl-6-methylpyridine were boiled during 2 hours with 150 ml of 4 N HCl. A quantity of a further 100 ml of 4 N HCl was added dropwise during 1 hour, during which time alcohol and HCl were distilled off. After evaporation there remained a quantitative yield of 5-hydroxy-4-hydroxymethyl-3-carboxymethylthiomethyl-6-methylpyridine M.P. = 188° C (dec).

Example 83

2 g of 5-[(3-Oxopropyl)thiomethyl]-8-methyl-4H-m-dioxino [4,5-c]-pyridine were suspended in water. At the same time there were added 4 g of 40percent $H_2O_2$ and 1 N sodium hydroxide. The addition of the sodium hydroxide was effected in such manner that the pH value remained all the time in the slightly alkaline range. The mixture was stirred continuously intensively. At the end of the reaction it was acidified and boiled in order to split off the protective group. After evaporation till dry, the acid was obtained by crystallation of the residue from glacial acetic acid. M.P. = 155° C. Yield: 58 percent β-[(5-hydroxy-4-hydroxymethyl-6-methylpyridyl(3)-methyl)thio]thio]-propionic acid.

EXAMPLE 84

0.02 moles of the starting material 5-[(2-hydroxyethyl)-thio-methyl]-2,2-8-trimethyl-4H-m-dioxino [4,5-c]-pyridine were oxidized by the addition of an alkaline (with sodium carbonate) potassium permanganate solution until there appears a first rose color indicating that no further reagent was used among. Manganese dioxide and the excess of permanganete was destroyed by introduction of $SO_2$ gas, acidified which hydrochloric acid boiled and evaporated till dry. From the residue the acid was obtained by crystallization from glacial acetic acid. Yield 42 percent of 5-hydroxy-4-hydroxymethyl-3-(carboxymethyl-thiomethyl)-6-methylpyridine, M.P. = 187°–188° C.

EXAMPLE 85

3.7 g of 5-acetoxy-4-acetoxymethyl-3-[(3-acetoxypropyl)-thiomethyl]-6-methylpyridine was boiled in 2 N HCl during 30 minutes under reflux. There was obtained 5-hydroxy-4-hydroxymethyl-3-[(3-hydroxypropyl)thiomethyl]-6-methylpyridine after distilling off the volatile constituents. The product was obtained as an oily hydrochloride. The IR spectrum does not show any carbonyl bonds. In the NMR spectrum there are no $CH_3$-signals of the acetyl residue at $\delta = 1.1$ ($d_6$-dimethyl-sulfoxide as solvent).

EXAMPLE 86

4.5 g 5-mercaptomethyl-2,2-8-trimethyl-4H-m-dioxino [4,5-c]pyridine in 60 ml dioxan were treated under intense stirring with 1 g of $CaH_2$ until the evolution of hydrogen has ceased. 1.5 g methyl iodide were added and stirring was continued under good closure during 12 hours at room temperature. After evaporation the residue was recrystallized from alcoholic hydrochloric acid. M.P. = 155° C (dec.). Yield: 3.95 g of 5-hydroxy-4-hydroxymethyl-3-methyl-thiomethyl-6-methyl-pyridine-hydrochloride.

EXAMPLE 87

To a solution of 0.022 moles of sodium methylate in methanol there was added dropwise with good stirring and cooling a stoichometric quantity of 5-[(3-chloro-3-oxo-propyl(thiomethyl)]-2,2-8-trimethyl-4H-m-dioxino[4,5-c]pyridine and stirred overnight. Precipitated sodium chloride was filtered off, the solution was evaporated and the residue recrystallized from methanol containing 1 drop of aqueous hydrochloric acid. Yield 85 percent of 5-hydroxy-4-hydroxymethyl-3-[(2-methoxycarbonyl)-ethyl]thiomethyl-6-methyl-pyridine M.P. = 122°–123° C.

EXAMPLE 88

13.6 g of S-[5-hydrogen-4-hydroxymethyl-6-methyl-pyridyl-(3) -methyl]cysteinedihydrochloride were suspended in 150 ml of absolute alcohol and HCl-gas was introduced till saturated. After leaving overnight the volatile components were removed. There was obtained S-[5-hydroxy-4-hydroxymethyl-6-methyl-pyridyl-(3)-methyl]cysteinethylesterdihydrochloride in the form of a colorless thick oil. Quantitive yield. IR-spectrum: ester bonds at 1,240 and 1,750 cm$^{-1}$ NMR-spectrum: triplet of ethyl group at 1.23 ppm. quartet of ethyl group at 4.22 ppm.

EXAMPLE 89

100 g of 5-hydroxy-4-hydroxymethyl-3-methylthiomethyl-6-methyl-pyridine were dissolved in 500 ml ethanol at elevated temperature, 100 ml alcoholic hydrochloric acid were added and cooled after filtration while hot. The precipitated crystals were sucked off and washed with a small quantity of ice cold alcohol. Yield 114 g of hydrochloride of the starting material. M.P. = 154°–155° C (dec.).

EXAMPLE 90

23.6 g of 5-hydroxy-4-hydroxymethyl-3-methylthiomethyl-6-methyl-pyridinhydrochloride were dissolved in 200 ml water and adjusted to a pH value of 7. Addition of 4N sodium hydroxide was made with the aid of a glass electrode with stirring. After stirring a further 10 minutes the precipitate was vacuum filtered and crystallized after drying from methanol. Yield 18 g (91 percent of theory) of the free base M.P. = 135° C.

EXAMPLE 91

24 g of 5-hydroxy-4-hydroxymethyl-3-[(2-cyanoethyl)thiomethyl]-6-methylpyridine were heated with 250 ml concentrated hydrochloric acid during 2 hours to 100° C. After evaporation of the solution to half the initial volume there was obtained crystalline 5-hydroxy-4-hydroxymethyl-3-[(2-carboxyethyl)thiomethyl]-6-methylpyridine, quantitive yield, M.P. = 155° C (from glacial acetic acid).

EXAMPLE 92

A mixture of 300 ml of 1 N NaOH, 11 g of 2-mercaptopropionic acid and 18.7 g of 5-hydroxy-4-hydroxymethyl-3-chlorometyl -6-methylpyridine were stirred during 4 hours at 20°, acidified with 25 percent hydrochloric acid and evaporated till dry. The residue was boiled with absolute ethanol resulting in 5-hydroxy-4-hydroxymethyl-3-[(1-carboxy-1-methyl)-metylthiomethyl]-6-methylpyridinehydrochloride, M.P. = 185° C (from methanol/ether), 81 percent. Analogously there was obtained from 3-mercapto propionic acid and the compound 5-hydroxy-4-hydroxymethyl-3-[(2-carboxylethyl)thiomethyl]-6-methylpyridinehydrochloride which has a M.P. of 162° C, yield 86 percent.

EXAMPLE 93

9.2 g (0.05 moles) of 5-hydroxy-4-hydroxymethyl-3- mercapto-methyl-6-methylpyridine were dissolved in a mixture of 3,1 g KOH and 50 ml methanol, 7.8 ml of bromo acet aldehyde diethylacetal was added and warmed for half an hour to 1 hour to 100° C. After filtering while still hot it was evaporated yielding 5-hydroxy-4-hydroxymethyl-3-[(2,2-diethoxy-ethyl-(1)]-thiomethyl-6-methylpyridine, M.P. 108°–110° C (from isopropyl ether/methanol); Yield 81 percent.

EXAMPLE 94

In a manner analgous to Example 5, 3-bromoethyl-5-hydroxy-4-hydroxymethyl-6-methylpyridine was reacted with the following aminoalkylmercaptans:
Methylaminomethylmercaptane,
Dimethylaminomethylmercaptane,
Methylaminoethylmercaptane,
Athylaminoethylmercaptane,
Dipropylaminoethylmercaptane,
Dihexylaminoethylmercaptane,
resulting in the following products I, which were advantageously isolated in the form of the dihydrochlorides
3-Methylaminomethylthiomethyl-4-hydroxymethyl-5-hydroxy-6-methylpyridine.
3-Dimethylaminomethylthiomethyl-4-hydroxymethyl-5-hydroxy-6-methylpyridine.
3-Methylaminoethylthiomethyl-4-hydroxymethyl-5-hydroxy-6-methylpyridine.
3-Ethylaminoethylthiomethyl-4-hydroxymethyl-5-hydroxy-6-methylpyridine.
3-Dipropylaminoethylthiomethyl-4-hydroxymethyl-5-hydroxy-6-methylpyridine.
3-Dihexylaminoethylthiomethyl-4-hydroxymethyl-5-hydroxy-6-methylpyridine.

The following Examples include pharmaceutical compositions of the novel compounds:

EXAMPLE A: Tablets

Each tablet contains

| | |
|---|---|
| 5-hydroxy-4-hydroxymethyl-3-methyl (or n-butyl or n-pentyl-)-thiomethyl-6-methyl-pyridine hydrochloride | 100 mg |
| lactose | 50 mg |
| corn starch | 20 mg |
| magnesium stearate | 2 mg |

EXAMPLE B: Coated Tablets

Each tablet contains

| | |
|---|---|
| 5-hydroxy-4-hydroxymethyl-b 3-isopropyl (or n-pentyl-or n-btyl or methyl-)-thiomethyl-6-methyl pyridine | 50 mg |
| lactose | 70 mg |
| talc | 2 mg |

The coating (150 mg) is a conventional mixture of corn starch, sugar, talc, and tragacanth.

EXAMPLE C: Syrup

A mixture of

| | |
|---|---|
| 5-hydroxy-4-hydroxymethyl-3-methyl (or n-butyl or n-phentyl)-thiomethyl-6-methyl pyridine | 0,2 kg |
| glycerol (twice distilled) | 7,5 kg |
| cane sugar | 56,0 kg |
| methyl p-hydroxybenzoate | 0,07 kg |
| n-propyl p-hydroxybenzoate | 0,03 kg |
| ethanol | 10,0 kg |
| fruit flavorings | as desired | prepared and mixed with distilled water in such a manner that the volume of the entire preparation is 100 l. A dosage unit (5ml) contains 10 mg of active substance.

Instead of the hydrochloride, other physiological compatible acid addition salts of 5-hydroxy-4-hydroxymethyl-3-methyl-(or n-butyl- or n-pentyl- or isopropyl-)thiomethyl-6-methylpyridine or the free base or other compounds covered by formula I as well as their physiologically compatible acid addition salts can be incorporated into similar compositions.

Thus instead of the 3-methyl- or 3-isopropyl-thiomethylpyridine compounds, used in the above Examples A, B and C, the corresponding 3-n-propyl-, 3-n-heptyl-, 3-n-decyl-, 3-eikosyl-, 3-$\beta$-aminoethyl-, 3-($\omega$-hydroxyhexyl)-, 3-allyl-, 3-propargyl-, 3-carbomethoxyethyl-, 3-hydroxymethyl- or 3-dimethylaminoethylthiomethylpyridine compounds are also to be used.

The preceding examples can be repeated with similar sucess by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modification of the invention to adapt it to various usages and conditions. Consequently, such changes and modifications are properly, equitably, and intended to be, within the full range of equivalence of the following claims.

We claim:

1. A member selected from the group consisting of a compound of the following formula and a physiologically acceptable salt thereof, said formula being:

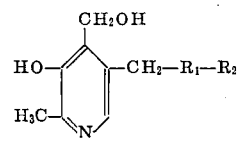

wherein
$R_1$ represents

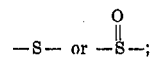

$R_2$ is selected from the group consisting of a lower carboxylic acid radical; lower allyl or propargyl; lower alkyl or linear unsubstituted alkyl of up to 20 carbon atoms; or lower alkyl or linear alkyl of up to 20 carbon atoms substituted in the $\omega$-position by one of halogen, OH, lower alkoxy, SH, lower alkylthio, unsubstituted carboxy or lower alkyl esters thereof; and

with the provision that when $R_1 = -S-$, $R_2$ is other than ethyl, $\beta$-chloroethyl or $\beta$-hydroxyethyl; and wherein $R_3$ and $R_4$ each represents H or lower alkyl.

2. A member as defined by claim 1 wherein
$R_1$ is $-S-$; and
$R_2$ is $-COCH_3$, $-COC(CH_3)_3$, allyl, propargyl, lower alkyl or linear unsubstituted alkyl of up to 20

C-atoms, lower alkyl substituted in the W position by one member selected from the group consisting of —Cl, —Br, —OH, —SH, —SCH$_3$, NH$_2$, NHCH$_3$, NHC$_2$H$_5$, —N(CH$_3$)$_2$, —N(C$_2$H$_5$)$_2$, N(C$_3$H$_7$)$_2$, N(C$_4$H$_9$)$_2$, N(C$_6$H$_{13}$)$_2$, —COOH, —COOCH$_3$, —COOC$_2$H$_5$, —OCOCH$_3$, —CN, —OC$_2$H$_5$ and —COCH$_3$.

3. A member as defined by claim 1, wherein R$_1$ represents S and R$_2$ represents CH$_3$.

4. A member as defined by claim 1, wherein R$_1$ represents

and R$_2$ represents CH$_3$.

5. A member as defined by claim 1, wherein R$_1$ represents S and R$_2$ represents n-C$_4$H$_9$.

6. A member as defined by claim 1, wherein R$_1$ represents S and R$_2$ represents n-C$_5$H$_{11}$.

7. A member as defined by claim 1, wherein R$_1$ represents S and R$_2$ represents —CH$_3$, n—C$_3$H$_7$, i—C$_3$H$_7$, —C$_4$H$_9$, —C$_5$H$_{11}$, —C$_6$H$_{13}$, —C$_7$H$_{15}$, —C$_8$H$_{17}$, —C$_9$H$_{19}$, —C$_{10}$H$_{21}$, —C$_{16}$H$_{33}$, —C$_{18}$H$_{37}$, —C$_{20}$H$_{41}$, —(CH$_2$)$_2$N(CH$_3$)$_2$, —CH$_2$CH(NH$_2$)COOH, —CH$_2$OH, —CH$_2$COOC$_2$H$_5$, —CH$_2$CH=CH$_2$, —CH$_2$—C≡CH, —COCH$_3$, —(CH$_2$)$_2$SCH$_3$, —(CH$_2$)$_2$SH, —(CH$_2$)$_2$NH$_2$, —COC(CH$_3$)$_3$, —(CH$_2$)$_2$COOCH$_3$, —(CH$_2$)$_2$OCOCH$_3$, —(CH$_2$)$_2$CN, —(CH$_2$)$_2$OC$_2$H$_5$, —CH$_2$CH(OH)CH$_3$, —(CH$_2$)$_5$—CH$_2$OH, —CH(COOC$_2$H$_5$)CH$_2$COOC$_2$H$_5$, —CH(CH$_3$)—CH$_2$COOC$_2$H$_5$, —CH$_2$CH(OH)CH$_2$OH, —(CH$_2$)$_2$—CH$_2$Br, —(CH$_2$)$_2$CH$_2$OH, —(CH$_2$)$_2$CH$_2$SH, —(CH$_2$)$_2$COOH, —CH$_2$CH$_2$CH=CH—COCH$_3$, —CH$_2$CH(Br)CH$_3$, —CH$_2$CH(Br)CH$_2$Br, —CH$_2$CH(Br)CH$_2$OH, —CH$_2$CH$_2$CH(Cl)CH$_3$, —CH$_2$—CH(OH)CH$_3$, —CH$_2$CH$_2$CH(OH)CH$_3$, —CH$_2$CH$_2$N(C$_4$H$_9$)$_2$, —CH$_2$CH$_2$CH$_2$NH$_2$, —CH$_2$COOH, CH$_2$CH(NH$_2$)COOC$_2$H$_5$, —CH(CH$_3$)COOH, —CH$_2$CH(OC$_2$H$_5$)$_2$, —CH$_2$N(CH$_3$)$_2$, —CH$_2$NHCH$_3$, —CH$_2$CH$_2$NHCH$_3$, —CH$_2$CH$_2$NHC$_2$H$_5$, —CH$_2$CH$_2$N(C$_2$H$_5$)$_2$, —CH$_2$CH$_2$N(C$_3$H$_7$)$_2$ or —CH$_2$CH$_2$N(C$_6$H$_{13}$)$_2$.

8. A member as defined by claim 1, wherein R$_1$ represents

and R$_2$ represents CH$_3$, C$_2$H$_5$, —CH$_2$—CH=CH$_2$, or —CH$_2$—C≡CH.

9. A member as defined by claim 1, wherein R$_2$ is unsubstituted alkyl.

10. A member as defined by claim 9, wherein R$_2$ is n—C$_5$H$_{11}$, n—C$_4$H$_9$ or CH$_3$.

11. A member as defined by claim 9, wherein R$_1$ is —S—.

12. A member as defined by claim 10, wherein R$_1$ is —S—.

* * * * *

UNITED STATES PATENT OFFICE
CERTIFICATE OF CORRECTION

Patent No. 3,755,336    Dated August 28, 1973

Inventor(s) Gustav Schorre et al

It is certified that error appears in the above-identified patent and that said Letters Patent are hereby corrected as shown below:

Column 52, line 6: Delete "$-CH_2 \quad CH_2CH(OH)CH_3,$"

Signed and sealed this 9th day of April 1974.

(SEAL)
Attest:

EDWARD M.FLETCHER,JR.
Attesting Officer

C. MARSHALL DANN
Commissioner of Patents